(12) United States Patent
Matheu et al.

(10) Patent No.: US 11,198,774 B2
(45) Date of Patent: Dec. 14, 2021

(54) CARBON COATED PARTICLES

(71) Applicant: Cabot Corporation, Boston, MA (US)

(72) Inventors: David M. Matheu, Somerville, MA (US); Theis F. Clarke, Houston, TX (US); David S. Crocker, Townsend, TN (US); Frederick H. Rumpf, Billerica, MA (US); David C. Reynolds, Winchester, MA (US); Dhaval A. Doshi, Lexington, MA (US); Martin C. Green, Boxborough, MA (US)

(73) Assignee: Cabot Corporation, Boston, MA (US)

( * ) Notice: Subject to any disclaimer, the term of this patent is extended or adjusted under 35 U.S.C. 154(b) by 81 days.

(21) Appl. No.: 16/693,233

(22) Filed: Nov. 23, 2019

(65) Prior Publication Data

US 2020/0190288 A1 Jun. 18, 2020

Related U.S. Application Data

(62) Division of application No. 15/139,449, filed on Apr. 27, 2016, now Pat. No. 10,519,298.

(60) Provisional application No. 62/304,694, filed on Mar. 7, 2016, provisional application No. 62/155,142, filed on Apr. 30, 2015.

(51) Int. Cl.

| | |
|---|---|
| *C08K 9/10* | (2006.01) |
| *C09C 1/02* | (2006.01) |
| *C09C 1/00* | (2006.01) |
| *C09C 1/36* | (2006.01) |
| *C09C 3/06* | (2006.01) |
| *C09C 1/42* | (2006.01) |
| *C09C 1/48* | (2006.01) |
| *C09C 1/40* | (2006.01) |
| *C09C 1/56* | (2006.01) |
| *C09C 1/30* | (2006.01) |
| *C04B 41/87* | (2006.01) |
| *C08K 9/02* | (2006.01) |

(52) U.S. Cl.
CPC ............... *C08K 9/10* (2013.01); *C04B 41/87* (2013.01); *C08K 9/02* (2013.01); *C09C 1/00* (2013.01); *C09C 1/024* (2013.01); *C09C 1/028* (2013.01); *C09C 1/3054* (2013.01); *C09C 1/3661* (2013.01); *C09C 1/407* (2013.01); *C09C 1/42* (2013.01); *C09C 1/485* (2013.01); *C09C 1/56* (2013.01); *C09C 3/063* (2013.01); *C01P 2004/45* (2013.01); *C01P 2004/50* (2013.01); *C01P 2004/62* (2013.01); *C01P 2004/64* (2013.01); *C01P 2004/86* (2013.01); *C01P 2004/88* (2013.01); *C01P 2006/12* (2013.01)

(58) Field of Classification Search
CPC .. C08K 9/10; C08K 9/02; C09C 1/028; C09C 1/00; C09C 1/3661; C09C 1/024; C09C 3/063; C09C 1/485; C09C 1/407; C09C 1/56; C09C 1/3054; C01P 2004/88; C01P 2004/62; C01P 2004/86; C01P 2004/45; C01P 2004/50; C01P 2004/64; C01P 2006/12; C04B 41/87

USPC .......................................................... 523/210
See application file for complete search history.

(56) References Cited

U.S. PATENT DOCUMENTS

| | | | |
|---|---|---|---|
| 2,632,713 | A | 3/1953 | Krejci |
| 3,048,559 | A | 8/1962 | Heller et al. |
| 3,095,273 | A | 6/1963 | Austin |
| 3,288,696 | A | 11/1966 | Orbach |
| 3,409,403 | A | 11/1968 | Bjornson et al. |
| 3,619,140 | A | 11/1971 | Morgan et al. |
| RE28,974 | E | 9/1976 | Morgan et al. |
| 3,984,528 | A | 10/1976 | Cheng et al. |
| 4,101,639 | A | 7/1978 | Surovikin et al. |
| 4,138,471 | A | 2/1979 | Lamond et al. |
| 4,251,500 | A | 2/1981 | Morita et al. |
| 4,315,901 | A | 2/1982 | Cheng et al. |
| 4,383,973 | A | 5/1983 | Cheng |
| 4,582,695 | A | 4/1986 | Dilbert et al. |
| 4,765,964 | A | 8/1988 | Gravley et al. |
| 4,822,588 | A | 4/1989 | Gravley et al. |
| 4,976,945 | A | 12/1990 | Kanamaru et al. |
| 5,190,739 | A | 3/1993 | MacKay et al. |
| 5,264,640 | A | 11/1993 | Platz |
| 5,527,518 | A | 6/1996 | Lynum et al. |
| 5,554,739 | A | 9/1996 | Belmont |
| 5,674,966 | A * | 10/1997 | McDermott ........... C08G 77/20 525/477 |
| 5,782,085 | A | 7/1998 | Steinwandel et al. |
| 5,830,930 | A | 11/1998 | Mahmud et al. |

(Continued)

FOREIGN PATENT DOCUMENTS

| | | |
|---|---|---|
| CA | 682982 A | 3/1964 |
| DE | 2703181 A1 | 7/1977 |

(Continued)

OTHER PUBLICATIONS

Norris, C.J. et al., "Pyrolytic carbon: factors controlling in-rubber performance," Plastics, Rubber and Composites, 43:8, 245-256 (2014). Thirteen pages.

(Continued)

*Primary Examiner* — Hannah J Pak

(57) ABSTRACT

Core particles produced in situ or introduced as preformed core particles are coated with a layer of carbon. Non-carbon as well as some carbon-based core materials can be utilized. The resulting carbon coated particles can find applications in rubber products, for instance as reinforcement for tire components.

8 Claims, 5 Drawing Sheets

(56) References Cited

U.S. PATENT DOCUMENTS

| | | | |
|---|---|---|---|
| 5,877,238 | A | 3/1999 | Mahmud et al. |
| 5,877,251 | A | 3/1999 | Sant |
| 5,904,762 | A | 5/1999 | Mahmud et al. |
| 5,922,118 | A | 7/1999 | Johnson et al. |
| 5,977,238 | A | 11/1999 | Labauze |
| 5,997,837 | A | 12/1999 | Lynum et al. |
| 6,017,980 | A | 1/2000 | Wang et al. |
| 6,048,923 | A | 4/2000 | Mabry et al. |
| 6,056,933 | A | 5/2000 | Vogler et al. |
| 6,057,387 | A | 5/2000 | Mahmud et al. |
| 6,071,995 | A | 6/2000 | Labauze |
| 6,075,084 | A | 6/2000 | Mabry et al. |
| 6,099,818 | A | 8/2000 | Freund et al. |
| 6,013,718 | A | 11/2000 | Cabioch et al. |
| 6,153,684 | A | 11/2000 | Shieh et al. |
| 6,221,329 | B1 | 4/2001 | Faulkner et al. |
| 6,277,350 | B1 | 8/2001 | Gerspacher |
| 6,358,562 | B1 | 3/2002 | Vollath et al. |
| 6,365,663 | B2 | 4/2002 | Mabry et al. |
| 6,391,274 | B1 | 5/2002 | Vogler et al. |
| 6,403,695 | B1 | 6/2002 | Soeda et al. |
| 6,471,763 | B1 | 10/2002 | Karl |
| 6,479,582 | B1 | 11/2002 | Hareyama et al. |
| 6,815,473 | B2 | 11/2004 | Robert et al. |
| 6,841,606 | B2 | 1/2005 | Yanagisawa et al. |
| 6,929,783 | B2 | 8/2005 | Chung et al. |
| 7,097,822 | B1 | 8/2006 | Godal et al. |
| 7,105,595 | B2 | 9/2006 | Mabry et al. |
| 7,300,964 | B2 | 11/2007 | Niedermeier et al. |
| 7,312,271 | B2 | 12/2007 | Chen et al. |
| 7,351,763 | B2 | 4/2008 | Linster et al. |
| 7,452,514 | B2 | 11/2008 | Fabry et al. |
| 7,514,062 | B2 | 4/2009 | Kopietz et al. |
| 7,655,209 | B2 | 2/2010 | Rumpf et al. |
| 7,829,057 | B2 | 11/2010 | Kutsovsky et al. |
| 7,922,805 | B2 | 4/2011 | Kowalski et al. |
| 8,609,060 | B1 | 12/2013 | Perry et al. |
| 8,871,173 | B2 | 10/2014 | Nester et al. |
| 8,975,316 | B2 | 3/2015 | Belmont et al. |
| 10,519,298 | B2 * | 12/2019 | Matheu ............... C09C 1/00 |
| 2003/0031856 | A1 | 2/2003 | Hareyama |
| 2003/0088006 | A1 | 5/2003 | Yanagisawa et al. |
| 2004/0220331 | A1 | 11/2004 | Sixt |
| 2005/0063892 | A1 | 3/2005 | Tandon et al. |
| 2005/0148723 | A1 | 7/2005 | Kondou |
| 2006/0089445 | A1 | 4/2006 | Gandon-Pain |
| 2007/0010463 | A1 | 5/2007 | Kutsovsky et al. |
| 2007/0274893 | A1 | 11/2007 | Wright et al. |
| 2008/0289494 | A1 | 11/2008 | Boutot et al. |
| 2009/0142250 | A1 | 6/2009 | Fabry et al. |
| 2009/0163617 | A1 | 6/2009 | Wong |
| 2010/0035750 | A1 | 2/2010 | Yang et al. |
| 2010/0209628 | A1 * | 8/2010 | Girshick ............... C23C 16/482 427/595 |
| 2012/0264875 | A1 | 10/2012 | Berriot et al. |
| 2013/0165560 | A1 * | 6/2013 | Belmont ............... C08K 9/04 524/105 |
| 2014/0045989 | A1 | 2/2014 | Wang et al. |
| 2014/0371385 | A1 * | 12/2014 | Verberne ............... C08K 3/36 524/571 |
| 2015/0105521 | A1 * | 4/2015 | Shoji ............... D01F 6/92 525/420 |
| 2015/0174550 | A1 | 6/2015 | Tranquilla |
| 2015/0197638 | A1 | 7/2015 | Dülger et al. |
| 2015/0210856 | A1 | 7/2015 | Johnson et al. |
| 2015/0210857 | A1 | 7/2015 | Johnson et al. |
| 2015/0210858 | A1 | 7/2015 | Hoermann et al. |
| 2019/0211208 | A1 | 7/2019 | Korchev |

FOREIGN PATENT DOCUMENTS

| | | |
|---|---|---|
| EP | 0949303 A1 | 10/1999 |
| EP | 1262528 A2 | 12/2002 |
| EP | 1489102 A1 | 12/2004 |
| EP | 1816144 A1 | 8/2007 |
| EP | 1834980 A1 | 9/2007 |
| EP | 1834985 A1 | 9/2007 |
| JP | 2002-338846 A | 11/2002 |
| JP | 2004-047404 A | 2/2004 |
| JP | 2006-045301 A | 2/2006 |
| WO | WO 9618688 A1 | 6/1996 |
| WO | WO 2014140228 A1 | 9/2014 |

OTHER PUBLICATIONS

Otto., S. et al., "New Reference Value for the Description of Filler Dispersion with the Dispergrader 1000 NT," KGK Kautschuk Gummi Kunststoffe 58 Jahrgang, Nr, 7-8, 390-393 (2005), Four pages.

Roy, C. et al., "The vacuum pyrolysis of used tires: End-uses for oil and carbon black products," Journal of Analytical and Applied Pyrolysis, 51, 201-221 (1999), Twenty-two pages.

Wang, M.J. et al., "Carbon Black," Kirk-Othmer Encyclopedia of Chemical Technology, 4, 761-803 (2005). Forty-three pages.

International Search Report and Written Opinion of the International Searching Authority of International Application No. PCT/US2016/029415, dated Jul. 21, 2016.

International Preliminary Report on Patentability of the International Searching Authority of International Application No. PCT/US2016/029415, dated Nov. 9, 2017.

\* cited by examiner

CARBON COATED PARTICLES

RELATED APPLICATIONS

This application is a divisional of U.S. application Ser. No. 15/139,449, filed on Apr. 27, 2016 which claims the benefit under 35 USC 119(e) of U.S. Provisional Application No. 62/155,142, filed on Apr. 30, 2015 with the title of Carbon-Coated Particles and Methods for Making and Using Same and 62/304,694, filed on Mar. 7, 2016, with the title Carbon-Coated Plasma Carbon Black, both of which are incorporated herein by reference in their entirety.

BACKGROUND OF THE INVENTION

Small, typically submicron size, particles are formulated into synthetic and natural rubber compounds used for a wide variety of rubber goods such as tires, hoses, belts, gaskets, bushings, etc. A wide variety of particles have been used or proposed for rubber compounding, but the most common is carbon black (CB). These particles allow the material properties of the compound to be substantially designed and improved for the application performance. For instance, they enable control of the rubber stiffness, hardness, modulus, and failure properties. Rubber compounded with a reinforcing CB can have a dramatic improvement in wear resistance and render rubber useful for tire treads and other demanding service applications.

A side effect of formulating rubber with reinforcing particles is that the rubber changes from highly elastic to viscoelastic in nature and the filled rubber dissipates energy when the rubber is mechanically cycled. An important practical consequence of this viscoelastic behavior is that tires dissipate mechanical energy as they flex upon rotation resulting in reduced vehicle fuel economy. Precipitated silica (PS) is commonly used in combination with synthetic rubber for automobile tire treads; the PS provides a rubber compound with somewhat reduced wear, compared with a similar CB based rubber compound, but an attractive improvement in energy loss and therefore tire rolling resistance and vehicle fuel economy.

Generally, CB exists in the form of aggregates, which, in turn, are formed of CB primary particles. In most cases, primary particles do not exist independently of the CB aggregate. While the primary particles can have a mean primary particle diameter within the range of from about 10 nanometers (nm) to about 50 nm, e.g., from about 10 nm to about 15 nm; from about 10 nm to about 20 nm; from about 10 nm to about 25 nm; from about 10 nm to about 30 nm; or from about 10 nm to about 40 nm, the aggregates can be considerably larger. CB aggregates have fractal geometries and are often referred in the art as CB "particles" (not to be confused with the "primary particles" discussed above).

Many types of CB are produced in a furnace-type reactor by pyrolyzing a hydrocarbon feedstock (FS) with hot combustion gases to produce combustion products containing particulate CB. Properties of a given CB typically depend upon the conditions of manufacture and may be altered, e.g., by changes in temperature, pressure, FS, residence time, quench temperature, throughput, and other parameters.

Equipment and techniques for producing CB are known in the art. An example is provided in US RE 28974, a reissue of U.S. Pat. No. 3,619,140, to Morgan et al., both documents being incorporated herein by reference in their entirety. The process involves generating a very hot combustion gas stream moving at very high speed in essentially plug flow by burning a fuel gas such as natural gas with oxygen, in a compact combustion zone and under conditions of very high heat release. Individual streams of liquid hydrocarbon (preheated carbon-black make oil or FS) are injected in a transverse direction to the high-speed combustion stream under conditions by which the liquid hydrocarbon enters the high-speed combustion stream at a linear velocity of more than about 100 feet per second.

The fuel in the combustion zone is completely burned with excess oxygen. CB nuclei are produced once the CB FS is injected and then these nuclei both coalesce and grow into the product CB aggregates.

Techniques for in-situ preparation of silicon-treated CB from CB FS and silicon precursor materials in a CB reactor are disclosed in U.S. Pat. No. 5,904,762 to Mahmud et al.; and U.S. Pat. No. 5,830,930 to Mahmud et al. Further, U.S. Pat. No. 5,830,930 discloses elastomeric compounds incorporating silicon-treated CB. U.S. Pat. No. 6,057,387 to Mahmud et al. discloses aggregate particles comprising a carbon phase and a silicon-containing species phase having certain particle surface area and size distribution characteristics. In such silicon-treated CB, a silicon containing species such as an oxide or carbide of silicon, is distributed through at least a portion of the CB aggregate as an intrinsic part of the CB. Such CB aggregates may be modified by depositing silicon-containing species, such as silica, on at least a portion of the surface of the CB aggregates during formation of the CB aggregates in a CB reactor. The result may be described as silicon-coated CB. In silicon-treated CB, the aggregates contain two phases. One phase is carbon, present as graphitic crystallite and/or amorphous carbon, while the second, discontinuous phase is silica (and possibly other silicon-containing species). The silicon-containing phase may be present in amounts of 0.1 to 25 wt % of the CB aggregate. Thus, the silicon-containing species phase of the silicon-treated CB is an intrinsic part of the aggregate; it is distributed throughout at least a portion of the aggregate or on the surface of the aggregate. U.S. Pat. No. 6,017,980 to Wang et al. discloses elastomer composites comprising aggregates of a carbon phase and 0.1 to 25 wt % of a metal-containing species phase (e.g., Al or Zn) and the formation of such aggregates in-situ in a CR reactor. As an option, a silicon-containing phase may be incorporated with the metal-containing species phase in the CB phase.

U.S. Pat. No. 2,632,713 to Krejci discloses an in-situ treated CB material comprising 0.01 to 10 wt % of a silicon, boron or germanium species. The additive material is introduced to a CB reactor with FS, or separately, and may be added further downstream in the reactor to yield a surface coating on CB particles. CB materials comprising surface domains of silica are disclosed in U.S. Pat. No. 7,351,763 to Linster et al. and in U.S. Pat. No. 6,071,995 to Labauze.

U.S. Pat. No. 6,099,818 issued to Freund et al. describes a process wherein CB nuclei are formed by the partial burning of fuel oil in oxygen-containing gas in the combustion chamber. The CB nuclei are carried by the stream of hot combustion gas into the reaction zone and are immediately brought into contact with the CB raw material forming CB particles that coalesce and grow into aggregates. According to U.S. Pat. No. 6,056,933 issued to Vogler et al., inversion CBs are manufactured in conventional CB reactors by controlling the combustion in the combustion chamber to form CB nuclei which are immediately brought into contact with the CB raw material. U.S. Pat. No. 6,391,274 to Vogler et al, describes a process in which CB seeds (or nuclei) formed in the combustion zone are carried with the flow of combustion gas into the reaction zone where they initiate a seed-induced CB formation with added CB raw material.

Silicon-containing compounds such as silanes or silicone oils are mixed with the CB raw material to produce a CB containing 0.01 to 20 wt % silicon.

Plasma-based techniques for preparing CB also have been developed. The Kværner process or the Kværner CB & hydrogen process (CB&H), for example, is a method for producing CB and hydrogen gas from hydrocarbons such as methane, natural gas and biogas. According to U.S. Pat. No. 5,527,518, issued to Lynum et al. on Jun. 18, 1996 and incorporated herein by reference in its entirety, a method for producing a carbon black material includes a first stage delivering feedstock through a feed tube to a plasma torch to a reaction area to raise the temperature of the feedstock to about 1600° C., then passing the dehydrogenated carbon material to a second stage to complete the decomposition to carbon black and hydrogen. Additional raw material causes quenching and reaction with formed carbon black to increase particle size density and quantity produced.

U.S. Patent Application Publication No. 2008/0289494 A1 to Boutot et al., published on Nov. 27, 2008 and incorporated herein by reference in its entirety, describes a method and apparatus for a cold arc discharge (CAD) used to decompose natural gas or methane into its gaseous constituents (hydrogen and acetylene) and carbon particles.

According to U.S. Pat. No. 7,452,514 B2, issued to Fabry et al. on Nov. 18, 2008, and U.S. Patent Application Publication No. 2009/0142250 A1 to Fabry et al., published on Jun. 4, 2009 and incorporated herein by reference in their entirety, CB or carbon containing compounds are formed by converting a carbon containing FS, using a process that includes the following steps: generating a plasma gas with electrical energy, guiding the plasma gas through a venturi, whose diameter is narrowing in the direction of the plasma gas flow, guiding the plasma gas into a reaction area, in which under the prevailing flow conditions generated by aerodynamic and electromagnetic forces, there is no significant recirculation of FS into the plasma gas in the reaction area, recovering the reaction products from the reaction area and separating CB or carbon containing compounds from the other reaction products.

In the process described in U.S. Pat. No. 4,101,639, issued on Jul. 18, 1978 to Surovikin et al. and incorporated herein by reference in its entirety, a hydrocarbon FS is introduced in a reaction chamber and into a plasma stream saturated with water vapor.

U.S. Patent Application Publication No. 2015/0210856 to Johnson et al., published on Jul. 30, 2015 and incorporated herein by reference in its entirety, describes a method and apparatus in which a plasma gas is flowed into a plasma forming region having at least one magnetically isolated plasma torch containing at least one electrode. Plasma is collected in a cooled header and flowed to a CB forming region which receives CB forming FS. A gas throat assembly connecting the plasma and the CB forming regions is described by Hoermann et al. in U.S. Patent Application Publication No. 2015/0210858, published on Jul. 30, 2015 and incorporated herein by reference in its entirety.

U.S. Patent Application Publication No. 2015/0210857 A1 to Johnson et al., published on Jul. 30, 2015 and incorporated herein by reference in its entirety, describes combusting FS (typically methane) with plasma in an apparatus having a series of unit operations with individual capacities. The individual capacities of the unit operations are substantially balanced by replacing at least part of the FS with a FS having a molecular weight heavier than methane.

Since a significant quantity of CB material is used to reinforce the rubber components of tires, used tires and other CB reinforced rubber products represent a significant waste stream. To dispose of such waste, used tires can be pyrolyzed and attempts have been undertaken to recover and re-use the carbon-based component.

Generally, pyrolysis is carried out in a reactor provided with an atmosphere devoid of oxygen. During the process, the rubber softens, then the rubber polymers break down into smaller molecules that are exhausted from the reactor as vapors (which can be subsequently condensed to a liquid oil phase) and gases. Also formed is a carbon-containing solid residue that can further include silica, alumina, zinc oxide and/or other compounds. See, for example, U.S. Pat. No. 4,251,500A issued to Morita et al.; U.S. Pat. No. 5,264,640A issued to Platz; and U.S. Pat. No. 6,221,329B1 issued to Faulkner et al.

With advances in equipment and techniques, the main products of a modern tire pyrolysis apparatus are oil, steel (reclaimed as steel wire) and a carbon char component ("pyrolytic carbon"). Properties of pyrolytic carbon are discussed, for example, by C. J. Norris et al., in Maney Online, Vol. 43 (8), 2014, pp. 245-256, incorporated herein by reference in its entirety. Possible applications for carbon obtained by pyrolyzing waste tires are described, for instance, by C. Roy et al. in the article *The vacuum pyrolysis of used tires—End-uses for oil and carbon black products*, Journal of Analytical and Applied Pyrolysis, Vol. 51 pp. 201-221 (1999).

SUMMARY OF THE INVENTION

There is a continued interest in developing reinforcing particles or agents that can bring about beneficial tire performance attributes. Lowering costs, reducing manufacturing burdens on the environment and widening the spectrum of reinforcing agents available are desired goals as well.

Specific properties of a rubber compound can be optimized not only by the size, morphology and other physical features of the reinforcing particles used, as known in the art but also by the chemical composition of the bulk and the surface of the particles. For instance, the highly reinforcing nature of CB may be attributed, at least in part, to the specifics of the interaction of the rubber molecules with the CB surface.

While it might be beneficial to utilize reclaimed pyrolysis carbon by formulating it into new rubber compounds, reclaimed pyrolysis carbons generally provide substantially inferior reinforcement and other rubber properties compared to virgin CB. Among other deficiencies it is believed that a major problem with the reclaimed pyrolysis carbon is that the particle surface has been substantially changed and degraded for interaction with rubber molecules compared to virgin CB.

In some cases, fresh CB particles can also display inferior rubber reinforcing properties. For example, the CB manufacturing process or post-manufacturing treatment of CB particles may remove chemical groups from the CB particle surface, or thermally anneal or graphitize the CB particle surface, creating crystalline regions, or otherwise degrade the activity of the CB particle surface to create inferior rubber reinforcement properties.

To address these and other concerns, the invention generally relates to a carbon-containing material, typically a particulate material, a process for making such a material and methods for using it.

The particle disclosed herein generally includes a core and a carbon-based outer region, also referred to herein as a "coating", "layer", "deposit" or "shell" and one aspect of the invention features carbon-coated particles including a core (material) coated with a carbon layer. In some implementations, the core is an aggregate or agglomerate covered in whole or in part by the carbon coating. The carbon coating or the carbon-coated particles can be an aciniform material having morphology and properties typical of a carbon black material. Illustrative examples of carbon coated particles comprise a non-carbon core, a reclaimed pyrolysis carbon core or a plasma carbon core, coated by a carbon layer.

Other aspects of the invention relate to a process for making carbon-coated particles. In the process, core particles are coated with a carbon layer in a reactor, often a CB reactor, or section thereof. Other suitable reactors such as, for instance, a plasma reactor or another type of reactor, one that utilizes methane, natural gas and the likes, for example, also can be utilized to conduct the coating operation. Generally, the carbon layer is prepared from a liquid or gaseous carbon-yielding FS.

In some embodiments the core particles are already made or "preformed" core particles that are introduced in a reactor and coated with a carbon layer to form carbon-coated particles. In other embodiments, the core particles are produced in situ and, in one implementation, the core particles are generated and coated in a staged integrated process conducted in a common reactor.

The core particles can consist of, consist essentially of or comprise carbon. Examples of suitable preformed carbon core particles include reclaimed pyrolysis carbon particles, plasma CB particles, preformed CB particles, in particular CB particles having poor reinforcing or other inferior surface properties and others.

Carbon-based core particles also can be generated in situ. For instance, core CB particles can be prepared via a plasma process or by another method in which a FS such as natural gas or methane, for example, is converted (cracked) to generate carbon and hydrogen, then coated with a carbon layer to form carbon-coated particles. Illustrative equipment that can be utilized includes: a plasma zone; a reaction zone downstream of the plasma zone; a finishing zone downstream of the reaction zone; a conduit for introducing a plasma gas to the plasma zone; one or more inlets for introducing a first FS into the reactor; one or more inlets for introducing a second FS into the reactor; a convergence zone between the plasma zone and the reaction zone; and, optionally, a convergence zone between the reaction zone and the finishing zone.

Non-carbon core particles also can be employed. Examples include but are not limited to silica, rice husk silica, precipitated silica, clay, calcium carbonate, other preformed non-carbon particles and mixtures thereof. In one example, preformed non-carbon core particles are introduced in a reactor such as, for instance, a CB reactor and coated to produce carbon-coated particles. In another example, non-carbon (e.g., silica) core particles are generated in situ (in a CB reactor, for example, using a suitable core precursor) and coated with a carbon layer in the reactor to form carbon-coated particles.

Several illustrative implementations are provided below.

In one embodiment, a process for making carbon-coated particles comprises: generating in situ core particles, wherein the core particles are plasma CB core particles or non-carbon core particles; and coating core particles with a carbon layer in a CB process to form the carbon-coated particles.

In another embodiment, a process for making carbon-coated particles includes: introducing preformed core particles in a CB reactor; and coating the core particles with a carbon layer, obtained by the pyrolysis of a liquid or gaseous feedstock in the CB reactor, thereby forming the carbon-coated particles.

In yet another embodiment, a process for preparing carbon-coated particles comprises: preparing in situ CB core particles in a CB reactor; and coating the CB core particles with a carbon layer obtained by the pyrolysis of a gaseous feedstock in the CB reactor, thereby forming the carbon-coated particles.

In a further embodiment, a method for making carbon-coated particles comprises: preparing CB core particles in a plasma process; and coating the CB core particles with a carbon layer to form the carbon-coated particles. In some cases, the CB core particles are prepared by a method including: generating a plasma in a plasma zone of a reactor; and converting a core yielding FS, introduced downstream of the plasma zone of the reactor, to the CB core particles and hydrogen gas.

In yet another embodiment, a process for preparing carbon-coated particles includes: introducing preformed core particles in a CB reactor or a plasma CB reactor; and coating the core particles with a carbon layer, wherein the carbon layer is generated from a gaseous FS.

In a further embodiment, a process for producing carbon-coated particles comprises coating core particles, such as non-carbon core particles, plasma CB core particles, preformed particles such as, for instance, reclaimed pyrolysis carbon (also simply referred to herein as "pyrolysis carbon") particles, degraded CB particles (namely particles of a CB that has inferior rubber reinforcing properties compared to the reinforcing properties expected from its morphology) or other types of CB particles, with a carbon layer in a CB reactor or finishing section thereof.

The invention presents many advantages. In many implementations, the carbon-based outer region, alone or in conjunction with the core material, provides properties, e.g., bulk or surface characteristics and/or chemistry, electrical properties, aggregate and/or primary size distribution, performance related features, etc., that can be the same, similar or improved compared to CB of a desired grade.

Properties of the particles can be tailored for a specific end use and in some examples the carbon-coated particles are utilized as reinforcement in tire or other rubber components. In specific implementations, the particles described herein yield rubber characteristics and application performance that may be the same, similar, or improved with respect to a comparative rubber composition formulated with CB of a given grade, such as an uncoated plasma CB of similar morphology, or a standard ASTM furnace black.

Having a carbon-based outer layer that can provide desired CB properties adds significant flexibility in choosing a core material. For instance, in comparison to traditional CB particles which present good particle-polymer but also strong particle-particle interactions, the latter interfering with ease of dispersion and increased rubber hysteresis or energy loss, using a silica core may reduce particle-particle interactions, while a carbon-based coating is thought to promote particle-polymer interactions and high reinforcement. In combination, these two trends may provide some of the materials described herein with properties attractive for rubber, e.g., tire, applications.

Techniques described herein also can be applied to change surface properties of reclaimed pyrolysis carbon or CB particles that display poor reinforcing or other characteristics found to be undesirable for rubber applications.

For instance, while it may be beneficial to utilize reclaimed pyrolysis carbon by formulating it into new rubber compounds, reclaimed pyrolysis carbons generally provide substantially inferior reinforcement and other rubber properties compared to virgin CB. Among other deficiencies it is believed that a major problem with reclaimed pyrolysis carbon is that, compared to virgin CB, the particle surface has been substantially changed and degraded for interaction with rubber molecules. Aspects of the invention address these deficiencies, rendering reclaimed pyrolysis carbon or other compounds obtained from discarded articles more attractive for certain applications, rubber reinforcement, for instance. This can have important environmental implications, encouraging recycling and reducing waste management and disposal burdens.

Practicing the invention can also make possible using lower cost core particles such as clays, rice husk silica, calcium carbonate, reclaimed pyrolysis carbon and others. Since the core of the particles described herein can be formed not only from pure or valued compounds but also from scrap recovered from other processes, aspects of the invention can contribute to cost reductions for the end product and/or the manufacture of certain CB grades. Incorporating such core materials in the particles described herein also reduces the consumption of petroleum-based feeds typically needed in the manufacture of CB. Importantly, non-carbon core particles (i.e., composite or aggregated particles in which the continuous phase is formed from a non-carbon material) can be even formed in situ, during the overall manufacture of a material such as described herein.

In the manufacture of CB, plasma-based processes can offer significant economic benefits such as, for instance, use of materials that can be relatively inexpensive and often widely available, natural gas (NG), for example. Other advantages relate to typically high yields, formation of useful products, namely carbon (C) and hydrogen ($H_2$) gas, and reduced emissions of carbon dioxide ($CO_2$) or nitrogen oxides ($NO_x$). However, the CB product obtained can lack some of the properties associated with the superior performance required nowadays in tire and other rubber components. When compared to conventional furnace CB, plasma CB may have low levels of interaction with rubber molecules, resulting in inferior reinforcing performance. Thus in some cases, the invention leverages benefits associated with plasma-based techniques for preparing CB, while also generating CB surface properties that enhance the performance of tire components or other rubber products.

Specific embodiments of the invention relate to deagglomerating core materials that are introduced in the CB reactor; this is thought to promote a more efficient and effective coating.

When used in the coating operation, liquid hydrocarbons need to be vaporized first, then mixed with core particles. With the very short time available, the resulting deposit may not be as thin and/or uniform as desired. As the vaporization step is bypassed when a gaseous hydrocarbon is employed to generate the coating, gaseous hydrocarbon may yield thinner and/or more uniform deposit. Implementations in which the layer formed onto the core particle is produced using NG or other gaseous hydrocarbons can also reduce or minimize $SO_x$ and/or $NO_x$ emissions.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
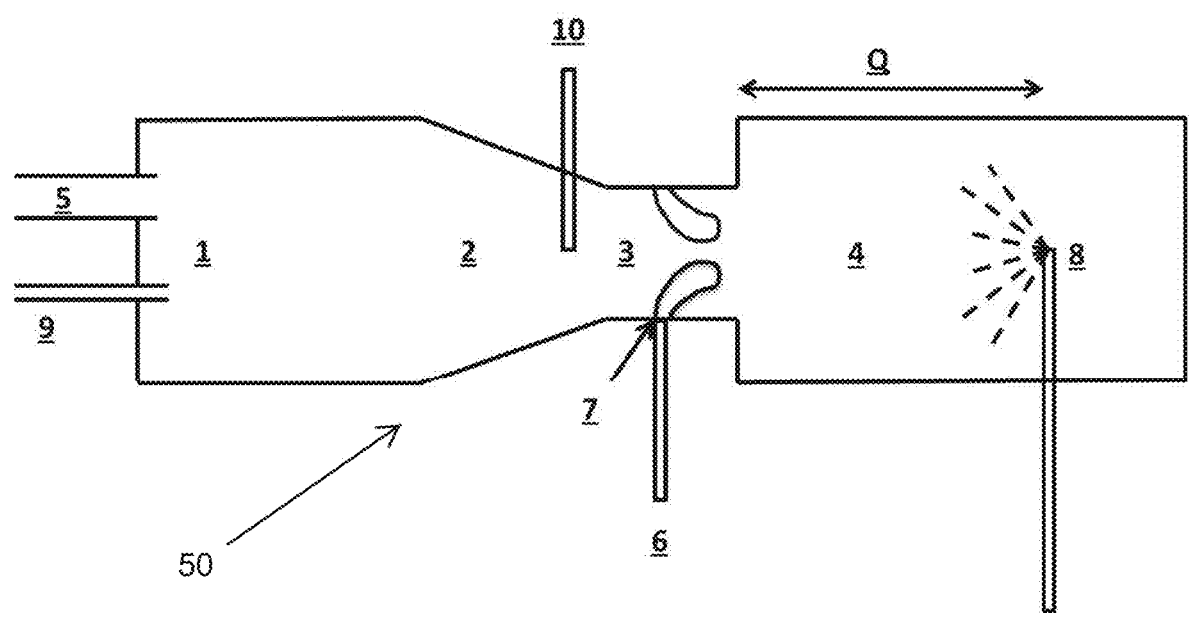
FIG. 1 is a cross sectional view of a reactor suitable for preparing carbon-coated particles according to further embodiments of the invention.

The invention generally relates to coated particles and methods for making and using them. A typical particle contains a core coated by a carbon layer. The core can consist of, consist essentially of or comprise a material that is different from the carbon coating. Generally, the core and the coating materials have different origins, chemical compositions, and/or other properties. The coated particles often can be thought of as composite particles, having one or more attributes that are different from those of the core. By itself, for instance, the core may not possess the properties needed or desired for a specific end use, for a superior reinforcement of tire components, for example. With an outer carbon deposit, the coated particles described herein can present different characteristics, thus finding important applications in reinforcing rubber compositions.

To make coated particles such as described herein, the core is coated with a carbon layer. In some embodiments, the carbon layer has morphology and properties typical of a carbon black material.

In some embodiments, the core material is provided as preformed or already made particles. These can be obtained commercially or prepared in a process and/or apparatus other than the process or apparatus employed to carry out the coating operation. Thus the steps undertaken to prepare the preformed core particles can be independent and often remote from the coating operation. Preformed cores can be composed of fresh (virgin) materials, materials reclaimed or recovered from waste manufactured goods or other products, or both.

Amounts of preformed core material to be provided can be determined by routine experiments, can be based on theoretical modeling, prior experience, or other techniques. Factors considered in determining loadings can include the equipment being used, process parameters, type of core material, FS employed, and/or other streams utilized, downstream steps, targeted properties and others.

In other embodiments, the core is produced in situ and coated in a common process and/or reactor. In situ techniques may require one or more suitable precursor(s), namely a substance or substances that, under certain conditions, can undergo reactions to generate the core material. The core precursor can be provided in any suitable amount, as determined by routine experimentation, modeling, desired properties in the coated particles, experience, process and/or equipment parameters, or other factors.

In some cases, the preparation of preformed core particles and the coating operation are conducted in separate stations or units that are part of an overall manufacturing process or system, typically conducted within a single facility.

Various core materials can be employed. Non-carbon cores, for example, can be made in whole or in part from a non-carbon material, such as silica, alumina, other metal oxides such as, titania, zirconia, ceria, tin oxide, magnesium oxide, magnesium aluminum silicate, clays, e.g., bentonite, natural or synthetic zeolites, reclaimed adsorbents, electronic components, catalytic materials, ash, non-carbon nanoparticles, and so forth. The core is defined as a "non-carbon core" if the continuous phase in the core is the non-carbon material. Similarly, a core particle, a core aggregate or a core agglomerate is, respectively, a "non-carbon core particle" a "non-carbon core aggregate" or a "non-carbon core agglomerate" if the continuous phase in the particle, aggregate or agglomerate is the non-carbon material.

In one specific example the core consists of, consists essentially of, or comprises silica, such as, for instance, colloidal silica, PS, reclaimed PS (e.g., from used tires), carbon black aggregates comprising regions of silica (e.g., Ecoblack™ particles), recovered finned silica, unmodified fumed silica, typically made by a pyrogenic process, hydrophobically modified fumed, colloidal, or other silica nanoparticles, mixtures containing one or more kinds of silica, and so forth.

The silica core material can be supplied in the form of already made silica core particles. Fresh material or a recovered waste product can be utilized.

It is also possible to produce silica core in situ. A suitable precursor can consist of, consist essentially of or comprise one or more silicon-containing material, for instance an organosilicon compound. Specific examples of compounds that can be used include silicones for instance volatile silicone polymers such as octamethylcyclotetrasiloxane (OMTS), silicates such as tetraethoxy orthosilicate (TEDS) and tetramethoxy orthosilicate, silanes, siloxanes, silazanes, and so forth.

Another illustrative embodiment involves a core that consists of, consists essentially of, or comprises a clay, rice husk silica, calcium carbonate, nanoparticles of these materials, other nanoparticles or mixtures thereof. Generally, these core materials are provided as preformed particles.

Carbon cores also can be utilized. As used herein, a core, core particle, core aggregate or core agglomerate is, respectively, a "carbon core", "carbon core particle", "carbon aggregate" or "carbon agglomerate" when the core consists of, consists essentially of, or comprises a material in which the continuous phase is carbon or CB.

Some aspects of the invention utilize a CB core produced, in whole or in part, in a process that employs electrical energy, typically a plasma-based process. Plasma processes convert a hydrocarbon FS (e.g., methane) to its components, namely carbon (referred to herein as "plasma carbon black" or "plasma CB" core particles) and hydrogen. For example:

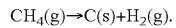

$CH_4(g) \rightarrow C(s) + H_2(g)$.

In addition to carbon and hydrogen, the conversion of the hydrocarbon can generate small amounts of acetylene, and/or traces of other hydrocarbons. The reaction is often conducted in the absence of oxygen. In cases in which oxygen-containing compounds are used, the off gas can include some CO and $CO_2$, with the latter typically being present in small or trace amounts.

According to some techniques (see, e.g., U.S. Pat. No. 3,409,403), the reaction proceeds through an intermediate stage in which the hydrocarbon FS is first converted to acetylene which is in turn decomposed to CB and $H_2$.

Plasma CB core particles can have properties such as, for example: $N_2$SA surface area of from about 50 to about 250 m2/g (ASTM D6556); STSA surface area 50-220 m2/g (ASTM D5816); OAN structure 50-300 cm3/100 g (ASTM D2414-16); COAN structure 40-150 cm3/100 g (ASTM D3493-16); toluene 70-87% (ASTM D1618-99, 2011); pH 7-9; ash 0.05-0.5% (ASTM D1506); CB yield 60-100%.

Various approaches for preparing plasma CB are known, as seen, for instance, in U.S. Pat. No. 5,527,518, issued to Lynum et al. on Jun. 18, 1996; U.S. Pat. No. 4,101,639, issued to Surovikin et al. on Jul. 18, 1978; U.S. Patent Application Publication No. 2008/0289494 A1 to Boutot et al., published on Nov. 27, 2008; U.S. Patent Application Publication No. 2009/0142250 A1 to Fabry et al., published on Jun. 4, 2009; U.S. Patent Application Publication Nos. 2015/0210856 A1 and 2015/0210857 A1, both to Johnson et al. and both published on Jul. 30, 2015; U.S. Patent Application Publication No. 2015/0210858 to Hoermann et al. All these documents are incorporated herein by reference in their entirety.

Both cold arc and hot arc discharges can be utilized to prepare the plasma CB core particles that are to be coated. While a hot arc discharge typically produces a continuous plasma arc which generates reactor temperatures within the range of from about 1,700° C. to about 4,000° C. and higher, a cold arc discharge may be thought of as an intermittent arc discharge that makes it possible for the reactor to operate at relatively low temperatures, typically below 200° C. Arrangements based on cold arc discharge to produce solid carbon particles and gaseous components such as hydrogen and acetylene mixed in with unreacted methane or natural gas are described, for example, in U.S. Patent Application Publication No. 2008/0289494 A1 to Boutot et al., published on Nov. 27, 2008.

Other techniques for preparing plasma CB core particles can be used as known in the art or as adapted or developed. For example, core particles can be prepared in a microwave plasma reactor. An illustration of such a reactor can be found in U.S. Patent Application Publication No. 20070274893 A1, to Wright et al., published on Nov. 29, 2007 and incorporated herein by reference in its entirety. U.S. Pat. No. 5,782,085, issued on Jul. 21, 1998 to Steinwandel, et al. and incorporated herein by reference in its entirety, presents techniques for generating a plasma jet using microwaves (in the range of between 0.95 and 24 GHz, for example). The high frequencies employed can be produced by magnetron systems or by traveling wave tubes. The waves can be guided over waveguides of a geometry designed to permit only certain wave types. Techniques that utilize electromagnetic energy that is in the microwave frequency range, radio frequency range, high frequency range, ultra-high frequency range or acoustic frequency range, as described, for instance, by J. Tranquilla in U.S. Patent Application Publication No. 2015/0174550 A1, published on Jun. 25, 2015 and incorporated herein by reference in its entirety, also can be employed.

Plasma CB cores can be generated in situ or provided as already made (preformed) plasma CB particles. Suitable solid plasma CB materials in particulate form can be obtained commercially or prepared in a process or apparatus other than the process or apparatus employed to carry out the coating operation.

Other aspects of the invention utilize a core that consists of, consists essentially of or comprises reclaimed pyrolysis carbon. This type of material is obtained from the pyrolysis of waste rubber products such as used tires, for example. In contrast to the carbon coating described herein, reclaimed pyrolysis carbon typically contains not only carbon but also other compounds used in the manufacture of tire components such as, for example, alumina, silica, zinc oxide, and so forth.

Reclaimed pyrolysis carbon can be characterized by properties such as, for instance, specific surface area ($m^2/g$), structure or DBP No. ($cm^3/100$ g), ash and/or sulfur content. For illustrative purposes, the specific surface area, DBP No., ash and sulfur contents reported by C. Roy (Journal of Analytical and Applied Pyrolysis, Vol. 51 pp. 201-221 (1999)) for carbon reclaimed from pyrolyzed truck tires were, respectively: 95 m2/g; 102 cm3/100 g; 0.7% and 0.5%. Typically, reclaimed pyrolysis carbon is provided in the form of already made (preformed) core particles.

Other types of carbon-based core material can be utilized. One illustrative example: employs CB that is prepared or obtained from an independent or separate process and/or apparatus and provided as preformed core particles. In specific implementations, the CB particle has poor reinforcing or other undesirable surface qualities or material properties relative to a typical carbon black having the same or equivalent morphology (a "degraded carbon black"). Such degraded carbon black may have been made intentionally so as to achieve a desirable property, but at the expense of a different desired property (e.g., making a very high surface area particle, but having an high I2/STSA ratio and an etched, porous surface). Other examples include an annealed CB particle, a CB particle having a low content of Polycyclic Aromatic Hydrocarbons (PAH), or a CB product of post-manufacturing treatment of CB that may remove chemical groups from the CB particle surface, or thermally anneal or graphitize the CB particle surface, creating crystalline regions, or otherwise degrade the activity of the CB particle surface to create inferior rubber reinforcement properties. Examples of poor surface quality core CB resulting from full or partial CB graphitization are disclosed, for example in U.S. Pat. No. 4,138,471 issued on Feb. 6, 1979 to Lamont et al. and U.S. Patent Application Publication No. 2005/063892A1 Tandon et al. Both documents are incorporated herein by reference in their entirety.

Core particles can be provided or generated in situ to have certain properties such as average particle size, particle size distribution, microstructure, etc. In many cases, the core particles are aggregates of primary particles or small agglomerates (containing a few aggregates, for example). Often, core aggregates can have an average aggregate size within the range of from about 25 nanometers (nm) to about 500 nm, e.g., from about 25 nm to about 200 nm, such as from about 25 nm to about 100 nm. In the case of CB materials, plasma CB, for instance, suitable core particles, i.e., aggregates of primary carbon particles, can have an average aggregate size within the range of from about 20 nanometers (nm) to about 500 nm, e.g., from about 25 nm to about 200 nm, such as from about 25 nm to about 100 nm. Core aggregates can have a characteristic microstructure, e.g., an aciniform morphology encountered, for example, in CB or silica aggregates. Core agglomerates can contain aggregates that are the same or different.

Some embodiments of the invention relate to utilizing mixtures of core particles. Any combinations of preformed, formed in situ, fresh, reclaimed and other types of core materials can be used, as can mixtures of core particles having different chemical compositions and/or properties. Whether formed in situ or preformed, one type of core particles can be combined with other carbon or non-carbon core materials, then coated. In turn, the other core material can be prepared in situ or supplied as already made particles. As an illustration, examples of other materials that can be added to plasma CB core particles include but are not limited to other types of carbon or CB, e.g., other CB grades, dual phase particles (e.g., CB and silica), acetylene black, lamp black, graphenes, carbon nanotubes, a non-carbon material, such as silica, alumina, other metal oxides such as, titania, zirconia, ceria, tin oxide, magnesium oxide, magnesium aluminum silicate, clays, e.g., bentonite, natural or synthetic zeolites, reclaimed adsorbents, electronic components, catalytic materials, ash, non-carbon nanoparticles, and so forth.

To prepare carbon-coated particles the core is coated with a carbon layer. The carbon layer is generated from a suitable carbon source, often a liquid hydrocarbon such as, for instance, by-products from coking operations and olefin manufacturing operations, decant oil, e.g., from catalytic cracking operations, coal tar, other petroleum refinery sources and so forth. Specific examples of carbon yielding FS compositions that can be utilized to coat core particles are provided in U.S. Pat. No. 5,190,739, issued to MacKay et al., incorporated herein by reference in its entirety.

Liquid hydrocarbons, however, can contain sulfur (S) and/or nitrogen (N) and thus the off-gas streams generated may require scrubbing or other types of emission clean-up to remove waste products such as $SO_x$ and/or $NO_x$. Accordingly, in some of the embodiments disclosed herein, the layer deposited onto the core particle is generated from a source free or substantially free of S and/or N. Examples include but are not limited to methane, NG, another gaseous source (one or more C1 to C4 hydrocarbons), for instance. Not requiring a vaporization step, gaseous hydrocarbons may facilitate formation of thinner and/or more uniform coatings.

In an illustrative example, a silica core material is coated with carbon generated by the pyrolysis of NG, propane or butane. In some cases, the silica is premixed with a gaseous FS (NG, propane or butane, for instance) and, optionally, with air. In another illustrative example, the core material that is coated with a carbon layer generated by the pyrolysis of a gaseous hydrocarbon FS (e.g., one or more C1 to C4 hydrocarbon(s)), such as, for instance, methane, NG, and butane, consists of, consists essentially of or comprises CB particles. For example, CB core particles can be coated with a carbon layer generated by pyrolysis of NG in a CB reactor. These CB core particles can be preformed or generated in situ.

The core particles are coated in a process conducted in a suitable apparatus. Optionally, the core itself is also produced in the same process and/or apparatus. Alternatively or additionally, the core material is supplied for coating as preformed particles. Several illustrative implementations are described below.

In one embodiment, the coating of core particles, whether produced in situ or introduced as already made (preformed), is carried out in a process and/or using a reactor (furnace) suitable for making CB, or in a section of such a reactor. CB processes, reactors or furnaces are known in the art.

Examples include but are not limited to those described in RE 28974, Reissue of U.S. Pat. No. 3,619,140 both issued to Morgan et al.; U.S. Pat. No. 5,877,238 to Mahmud et al.; U.S. Pat. No. 5,190,739 issued to MacKay et al.; WO 2014/140228A1 to Schwaiger et al.; U.S. Pat. No. 6,277,350B1 issued to Gerspacher; U.S. Pat. No. 7,097,822B1 issued to Godal et al.; U.S. Pat. No. 4,582,695A issued to Dilbert et al.; U.S. Pat. No. 6,099,818 issued to Freund et al.; U.S. Pat. No. 6,056,933, issued to Vogler et al.; U.S. Pat. No. 6,391,274, issued to Vogler et al.; and others. A multi-staged reactor and process for producing CB is described in U.S. Pat. No. 7,829,057, issued to Kutsovsky et al, on Nov. 9, 2010, and U.S. Patent Application Publication No. 2007/0104636 A1, by Kutsovsky et al., published on May 10, 2007. A multi-stage reactor and process for producing CB, and for producing composite silicon or metal containing CB aggregate particles, is disclosed in U.S. Pat. No. 5,904,762 to Mahmud et al. These patents are incorporated herein by reference in their entirety. Other CB reactors and/or methods can be utilized, as known in the art.

In the example shown in FIG. 1, hot combustion gases are generated in combustion zone 1 by contacting liquid or gaseous fuel steam 9 with oxidant stream 5, for example air, oxygen, or mixtures of air and oxygen (also known in the art as "oxygen-enriched air"). The fuel can be any readily combustible gas, vapor or liquid streams such as hydrocarbons (e.g., methane, natural gas, acetylene), hydrogen, alcohols, kerosene, fuel mixtures and so forth. In many cases, the fuel selected has a high content of carbon-containing components.

Thus various gaseous or liquid fuels, e.g., hydrocarbons, may be used as the combustion fuel. The equivalence ratio is a ratio of fuel to the amount of oxidant required to combust the fuel. Typical values for the equivalence ratio in the combustion zone range from 1.2 to 0.2. To facilitate the generation of hot combustion gases, the oxidant stream may be pre-heated.

Many embodiments of the invention pertain to a combustion step that completely consumes the combustion fuel. Excess, oxygen, fuel selection, burner design, jet velocities, mixing conditions and patterns, ratios of fuel to air, oxygen enriched air or pure oxygen, temperatures, and other factors can be adjusted or optimized to ensure, for example, that the combustion generates little or no carbon seeds or nuclei. Rather, in a typical CB process, these nuclei are formed only after the CB yielding FS is introduced into the reactor. When utilizing in situ non carbon core particles, delaying formation of the carbon nuclei relative to that of the core particles reduces or minimizes the inclusion of carbon in the cores.

The hot combustion gas stream flows downstream from zones 1 and 2 into zones 3 and 4. The coating-yielding FS (also referred to herein as coating FS, carbon-yielding FS, CB-yielding FS, or CB FS) is introduced at one or more suitable locations relative to other reactor components and feeds. In the arrangement shown in FIG. 1, coating FS 6 is introduced to reactor zone 3 at injection point 7.

The coating FS can be injected into the gas stream through nozzles designed for optimal distribution of the oil in the gas stream. Such nozzles may be either single or bi-fluid. Bi-fluid nozzles may use, for example, steam, air, or nitrogen to atomize the fuel. Single-fluid nozzles may be pressure atomized or the FS can be directly injected into the gas-stream. In the latter instance, atomization occurs by the force of the gas-stream.

The coating FS can be, for instance, a liquid or gaseous hydrocarbon capable of producing CB upon pyrolysis or partial combustion. Suitable examples include but are not limited to petroleum refinery sources such as decant oils from catalytic cracking operations, as well as the by-products from coking operations and olefin manufacturing operations. Specific examples of carbon yielding FS compositions are provided in U.S. Pat. No. 5,190,739, issued to MacKay et al. and incorporated herein by reference in its entirety. NG, methane, hydrocarbons, e.g., C2 to C8 hydrocarbons (propane, butane, ethylene, propylene, butadiene, other gaseous carbon sources or mixtures of liquid, gaseous or liquid and gaseous sources also can be utilized.

In a specific implementation, a gaseous hydrocarbon, methane, NG or butane, for instance, is utilized to coat in situ CB core particles formed in a CB process, reactor or furnace such as, for example, those disclosed in RE 28974, Reissue of U.S. Pat. No. 3,619,140 both issued to Morgan et al.; U.S. Pat. No. 5,877,238 to Mahmud et al.; U.S. Pat. No. 5,190,739 issued to MacKay et al.; WO 2014/140228A1 to Schwaiger et al.; U.S. Pat. No. 6,277,350B1 issued to Gerspacher; U.S. Pat. No. 7,097,822B1 issued to Godal et al.; U.S. Pat. No. 4,582,695A issued to Dilbert et al.; U.S. Pat. No. 6,099,818 issued to Freund et al.; U.S. Pat. No. 6,056,933, issued to Vogler et al.; U.S. Pat. No. 6,391,274, issued to Vogler et al.; U.S. Pat. No. 7,829,057, issued to Kutsovsky et al. on Nov. 9, 2010, U.S. Pat. No. 5,904,762 to Mahmud et al, and U.S. Patent Application Publication No. 2007/0104636 A1, by Kutsovsky et al., published on May 10, 2007.

The CB core particles can be generated in situ from a core-yielding FS, often one or more liquid hydrocarbon(s) or oil(s), for instance a commercially available FS having the properties listed in U.S. Pat. No. 5,190,739. Typically, the core-yielding FS is introduced into a reactor such as reactor 50 of FIG. 1 upstream from the injection of the coating FS. Suitable injection points or locations that can be employed are described, for example, in U.S. Pat. No. 7,829,057. The core-yielding FS can be introduced in any conventional way such as a single stream or plurality of streams and the introduction of the FS can occur at any rate. With a plurality of streams, the rates for each stream can be the same or different.

In many cases, injection of the core-yielding FS is conducted in a manner that promotes penetration into the interior regions of the hot combustion gas stream and/or a high rate of mixing and shearing of the hot combustion gases and the core-yielding FS, to ensure that the FS rapidly and completely decomposes and converts into a core CB material.

With respect to the subsequent introduction of the gaseous coating FS, this second FS can be added downstream of the core-yielding FS in an amount and under conditions suitable for coating the in situ CB core particles with a carbon layer. Using a gaseous coating FS can cool the reactor, often to a larger degree than the cooling obtained using an equivalent amount of oil FS. Also, injector tip limitations encountered with oil FS are avoided. In contrast to using a liquid, e.g., oil, hydrocarbon, a gaseous coating FS can provide environmental benefits and improvements in the quality of the coating.

Further implementations relate to the introduction of one or more precursor(s) for making in situ non-carbon core particles. Such a precursor can be premixed with the coating FS and introduced with the FS into the reaction zone. In one implementation the precursor is co-injected with coating FS 6. In other implementations, the precursor is introduced separately from the coating injection point.

According to specific embodiments of the invention, the carbon coating step follows the in situ formation of core particles and injection points of the core precursor can be determined based on temperatures, reactor parameters, reaction kinetics, mixing times and patterns, residence time, and so forth. Thus from case to case, the precursor can be introduced upstream, downstream or at the same point as the coating FS injection point. Typically, the precursor is introduced upstream from the injection of quenching fluid. In one implementation, the reactions required to generate the core particles occur faster than those leading to formation of the carbon material (CB precursors) needed to effect the core coating. As a result, the core precursor can be co-injected with the coating FS or can be injected separately upstream, at the same point along the reactor, as well as downstream of the injection point for the coating FS. Referring to FIG. 1, for instance, the precursor, e.g., a silicon-containing precursor that generates silica cores, may be co-injected with coating FS 6. If desired, such a precursor also can be introduced upstream or slightly downstream of FS 6.

Amounts of precursor to be used can be determined by routine experimentation, calculations, modeling, experience and so forth. Factors to be considered include but are not limited to type of materials being employed, equipment and/or process parameters, e.g., production rate and/or capacity, various input and output streams, targeted properties of the core and others.

Conditions that promote formation of a non-carbon core (in preference to incorporating a carbon continuous phase into the core) include but are not limited to, the ratios of CB yielding FS and non-carbon precursor, reactor temperature, particularly in the reaction zone and others. For example, increasing the amount of silicon precursor relative to CB yielding feed stock favors formation of the non-carbon core, followed by a carbon coating step. It is also possible to use a lower-yielding CB feed stock, such as, for example, certain vegetable oils, e.g., soybean oil, thus decreasing the amount of carbon material available in the reaction zone. Alternatively or in addition, the reaction zone can be kept at a temperature that is sufficiently high to favor the fast conversion of precursor to non-carbon core (i.e., a core in which the continuous phase is the non-carbon material) over the slower conversion of CB yielding FS to CB. In one example, the reaction zone temperature used to form silica cores from a silicon-containing compound is within the range of from about 1680° C. to about 1800° C., a temperature at which the silica precursor reacts much faster than does the CB yielding FS.

Preformed core particles (for instance, silica, rice husk silica, clay, precipitated silica, calcium carbonate, nanoparticles, reclaimed pyrolysis carbon, plasma CB, other types of already made CB, e.g., a degraded CB (namely a CB that has inferior rubber reinforcing properties compared to the reinforcing properties expected from its morphology), and so forth can be introduced in a reactor such as that shown in FIG. 1 at a suitable injection point, for example, at, upstream, or downstream of injection point 7. More than one means and/or injection points can be used. Preformed core particles can be supplied in one of the existing gaseous or vapor reactor feed streams or co-injected with the coating FS (stream 6 in FIG. 4). Alternatively, or additionally, preformed core particles can be dispersed in a liquid stream, for example in aqueous solutions, water, light hydrocarbons or others, or can be introduced independently in a carrier gas supplied to the reactor at a suitable location, such as, for example, stream 10 in FIG. 1. Inert gas, recycled CB tail gas and/or other carrier gases can be utilized. Preformed core particles also can be provided in a supercritical fluid such as, for instance supercritical $CO_2$, or can be introduced with an existing stream, e.g., air or even fuel stream (in FIG. 1, streams 5 and 9, respectively). At least a portion can be used as fuel in the combustion zone.

Amounts of preformed core material to be provided can be determined by routine experiments, can be based on theoretical modeling, prior experience, or other techniques. Factors considered in determining loadings can include equipment used, process parameters, specifics of the material utilized, FS type, and/or other streams utilized, downstream steps, targeted properties and others.

In some situations, clump formation of preformed particles can be detrimental to the manufacture of a final product having desired properties, e.g., properties rendering end use coated particles suitable for incorporation in rubber compositions for tire applications. The problem can be addressed through various deagglomeration techniques, by homogenizing preformed core particles into the coating FS stream or milling for instance in a fluid energy mill, jet mill or other powder milling equipment just prior to injection via a gas carrier stream.

In one implementation the preformed core material is dispersed into sufficiently fine particles for effective subsequent coating. For instance, the core material can be blended or homogenized with a liquid carbon-yielding FS and injected as a slurry of core particles in the coating FS. Preformed core particles also can be homogenized into water or other aqueous or solvent liquid and then injected separately from the coating FS or after blending with the coating FS. Preformed core materials may also be conveyed into the reactor by a new (see, e.g., stream 10 in FIG. 1) or existing (gas) stream, including the combustion air stream, or the natural gas (combustion fuel) stream. Inert gas, recycled CB tail gas and/or other carrier gases also can be utilized.

Homogenization of preformed core particles may be carried out as known in the art and may involve a homogenizer, such as, for instance, a colloid mill described in U.S. Pat. No. 3,048,559 issued to Heller et al. on Aug. 7, 1962. A wet-operated micropulverizer also can be used, as can other means utilizing either mechanical impact, similar to the micropulverizer, or grinding action, similar to the colloid mill described. Other examples of suitable homogenizers include but are not limited to the Microfluidizer® system commercially available from Microfluidics International Corporation (Newton, Mass., USA); models MS 18, MS45 and MC120 Series homogenizers available from the APV Homogenizer Division of APV Gaulin, Inc. (Wilmington, Mass., USA) as well as other commercially available or custom made equipment.

A different approach relates to techniques designed to cover cores that are relatively large (e.g., 200 nm to about 1, 5, or 20 microns). Such agglomerates, containing the same or different aggregates, can be coated with an "effective" CB layer, i.e., enough CB coating to produce enhanced reinforcement and/or balance of rubber performance properties compared to an appropriate reference. If agglomerates can be dispersed to sizes of less than, preferably significantly less than 20 microns, then coating the agglomerate may be effective in a manner similar to that obtained by coating aggregates of primary particles. Complete coating may not be necessary in order to realize advantages associated, for example, with a carbon-coated silica core. It is believed that CB precursors may be able to penetrate and coat, even if only partially, core aggregates within the agglomerate. When these coated agglomerates are mixed into the rubber they may become sufficiently broken and dispersed so that even with an incomplete coating of the core aggregates they provide beneficial combination of performance and cost.

Whether introduced as an already made material (pre-formed) or generated in situ core particles travel downstream through the reactor and become coated with carbon. Typically, with suitable heating, the carbon-yielding (coating) FS becomes pyrolized, generating CB precursors that deposit onto the core particles. In a reactor such as that of FIG. 1, the coating can begin to take place at any point at or after the injection of the coating FS and can continue through a subsequent stage or stages.

The reaction is arrested in the quench zone of the reactor. Quench 8 is located downstream of the reaction zone and sprays a quenching fluid, such as water, into the stream of newly formed CB particles. The quench serves to cool the CB particles and to reduce the temperature of the gaseous stream and decrease the reaction rate. Q is the distance from the beginning of reaction zone 4 to quench point 8, and will vary according to the position of the quench. Optionally, quenching may be staged, or take place at several points in the reactor. A pressure spray, a gas-atomized spray or other quenching techniques also can be utilized.

After quenching, the cooled gases and carbon-coated particles pass downstream into any conventional cooling and separating means whereby the product is recovered. The separation of the carbon-coated particles from the gas stream is readily accomplished by conventional means such as a precipitator, cyclone separator, bag filter or other means known to those skilled in the art. After the carbon-coated particles have been separated from the gas stream, they are optionally subjected to a pelletization step.

Another embodiment utilizes plasma CB core particles that are produced in situ, then coated, in a staged approach. Processes and systems for conducting both the formation of plasma CB core particles and then their coating with a carbon layer are referred to herein as "integrated" and are further described below with reference to embodiments illustrated in FIGS. 2, 3 and 4.

Figure 2:
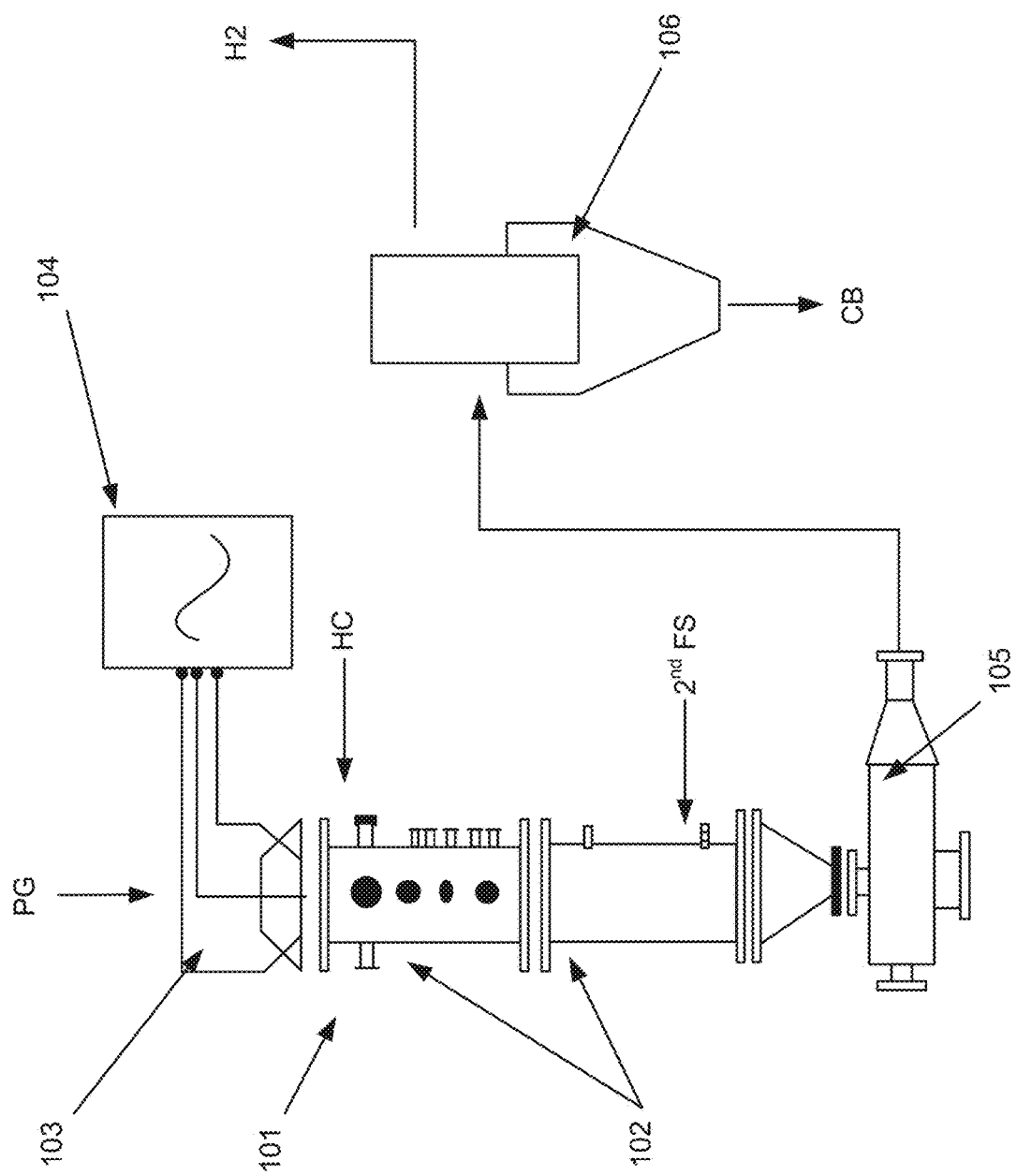
FIG. 2 is a schematic diagram of an apparatus suitable for preparing carbon-coated particles according to embodiments of the invention.

As an example, shown in FIG. 2 is reactor 101 including chamber 102 which has a cylindrical or other suitable shape. In many cases, the interior walls of the reactor chamber are made from graphite. The formation of core particles and their coating with a carbon layer is conducted in reactor zones or regions, as further described below. Reactor 101 is provided with conduits and injection means for supplying plasma gas (PG), a first FS (HC in FIG. 1) and a second (coating) FS (FS), as indicated by the arrows. If desired, one or more of these streams can be preheated, as known in the art or as developed or adapted to meet specific process condition or apparatus design. The reactor can include additional inlets, one or more outlets, for collecting product, for example, units for further handling products, by-products or unreacted materials, valves, flow meters, temperature controls, devices utilized to monitor or control process steps, computer interfaces, automation means and so forth.

In the illustrative example described here, reactor 101 includes head section 103 (shown in more detail in FIG. 3) which defines an upper end of the reactor. Mounted at this end are three graphite electrodes 108 (only two being shown in FIG. 3). The electrodes are connected to power source 104 (shown in FIG. 2) which is capable of delivering a three phase AC current. The current frequency can be the network frequency (50 to 60 Hz) or any other, e.g., higher, frequency.

PG is fed into reaction chamber 102 at a center of head section 103 (injection port 107 in FIG. 3) at a flow rate that can be adjusted depending on the nature of the PG and the electrical power. For instance, it can be between about 0.001 normal cubic meters per hour ($Nm^3/h$) and about 0.3 $Nm^3/h$ per kW of electric power. Other flow rates can be selected taking into account power requirements, production capacity, specific process parameters or equipment design, and so forth, as known in the art or arrived at by calculations, modeling or routine experimentation. In some implementations, the electric power supplied to electrodes 8 is about 2.0 MW and a hydrogen PG is fed to a reactor such as that described above at a rate of from about 10 $Nm^3/h$ to about 1000 $Nm^3/h$, such as within the range of from about 100 to about 900, from about 200 to about 800, from about 300 to about 700, from about 400 to about 600, e.g., about 500 $Nm^3/h$. Examples of gases other than hydrogen gas that can be employed as PG include but are not limited to nitrogen, carbon monoxide (CO), inert or noble gases such as argon, helium and the like, as well as other gases or mixtures of two or more gases, for instance a mixture of 50% vol CO and $H_2$.

The tips of electrodes 108 are disposed in the pathway of the PG flow and are arranged in sufficiently close proximity of one another to ignite an electric compound arc (when enough power is supplied by source 4), generating a plasma within arc or plasma zone 109. The temperature of this plasma can be controlled, for example, by the PG flow and the electric power provided to electrodes 108. In specific implementations, arc zone 109 is monitored optically through opening 115, allowing automatic control of the temperature and/or the quantity of the plasma gas flow.

From the arc zone, the PG stream or jet proceeds downstream. The speed of the PG flow can be increased by providing a convergence zone such as venturi element 111, typically made of graphite, and throat or contraction 120. In some implementations, the lower end of the venturi is formed as a sharp edge (rather than as a continuous widening section), facilitating abrupt expansion as the PG gas enters reaction zone 110. Other embodiments utilize a gas throat assembly such as described in U.S. Patent Application Publication No. 2015/0210858, incorporated herein by reference in its entirety.

Also introduced to reaction zone 110 is a carbon source for preparing the plasma CB core particles (stream HC in FIG. 2), also referred to herein as a "first FS", a "core yielding FS" or simply as a "core FS". In many aspects of the invention, the first FS consists of, consists essentially of or comprises methane or natural gas. Examples of other suitable materials that could be employed include but are not limited to hydrocarbons, such as C2 to C8 hydrocarbons (propane, butane, ethylene, propylene, butadiene, for example) light oil, heavy oil, waste or pyrolysis oil, biogas, other fuels that contain carbon and hydrogen, combinations thereof, and so forth.

The first FS can be injected through one or a plurality (2, 3, 4, 5 or more) of ports or injectors at location 113, disposed within wall 112 of reactor chamber 102. Introducing the core-yielding FS below, and preferably just below venturi 111, is thought to improve the mixing with the PG. The first FS can be injected directly or radially towards the center of reaction zone 110. It also can be injected in a more tangential manner, thus entering reaction zone 110 off center or with a certain angle of co- or contra-flow. Suitable flow rates for introducing the first FS can be determined based on calculations, modeling, experience, routine experimentation and so forth, taking into account the nature of the feed stock, reactor size, production capacity, electrical power, product output, other flow rates and/or other considerations. In some implementations, a first FS that is methane or natural gas is fed to a reactor such as that of FIGS. 2 and 3 at a flow rate within the range of from about 100 to about 1000 $Nm^3/h$, such as within the range of from about 200 to about 800, from about 300 to about 700, or from about 400 to about 600

Nm³/h. In the case of a typical liquid first FS, flow rates utilized can be within the range of from about 10 to about 500 kg/h, such as from about 100 to about 400, from about 100 to about 300 or from about 100 to about 200 kg/hour. Higher or lower amounts also can be used. In some cases, the first FS is introduced at a rate of at least 2, 5, 10, 12, 15, 18, 20, 22, 25, 28, 30, 32, 35 or more metric tons per hour.

The temperature in the reaction zone can be adjusted by manipulating one or more parameters such as, for example, the PG flow rate, its temperature, the nature and/or flow rate of the first FS, the electrical power supplied to electrodes 108, and/or other process conditions. In specific examples the temperature in the reaction zone is within a range of from about 900° C. to about 3000° C., such as within the range of from about 1300° C. to about 1900° C., e.g., from about 1400° C. to about 1800° C. The pressure with which the FS is injected can affect the surface area of the core particles.

In many cases the pressure in the reactor is maintained slightly above atmospheric thus preventing any oxygen intake from ambient air.

One or more of the process steps leading to the formation of plasma CB core particles can be designed as unit operations with individual capacities, as described, for instance, in U.S. Patent Application Publication No. 2015/0210857 A1.

The plasma CB core particles generated in reaction zone 110 are coated with a carbon layer in a finishing operation in which a second FS (also referred to herein as the "coating-yielding FS" or "coating FS") is pyrolized to deposit an active carbon surface onto the plasma CB core particles. Suitable materials that can be utilized as a second FS include but are not limited to petroleum refinery sources such as decant oils from catalytic cracking operations, by-products from coking operations and olefin manufacturing operations, ECR fuels, and so forth. Examples of coating FS compositions can be found in U.S. Pat. No. 5,190,739, issued to MacKay et al, and incorporated herein by reference in its entirety. In many embodiments the second FS is different from the first FS. In other cases, the second FS is the same as the first FS.

Typically, the second FS is provided downstream from the injection point of the first FS through one or more ports or injectors at location 114. In the example shown in FIG. 3, the second FS is introduced at or below convergence zone 116 and can be injected radially inward from the circumference of the convergent section. Convergence zone 116 includes optional contraction or throat 122 and serves to accelerate the plasma CB core particles and $H_2$ reaction product. The design of convergence zone 116 can be the same as or different from the first convergence zone (venturi element 111 in FIG. 3). Similarly, the configuration of the first and second throats (120 and 122, respectively) can be the same or different. Taper angles and/or diameters can be selected based on flow rates, capacity, design parameters, and/or other considerations. For instance, throat 122 can be wider than throat 120 to accommodate additional gas evolved during the pyrolysis of the first FS. In other situations, the diameter of throat 122 is smaller or equal to that of throat 120. Cones or other arrangements that result in a smaller ring also can be utilized.

In further embodiments, the finishing operation is conducted in the absence of a convergence zone, by simply spraying the coating FS into the stream carrying the plasma CB core particles, the coating FS being introduced at one or more suitable locations. Approaches in which the distinction between the first stage (formation of core particles) and the second stage (finishing stage) is reduced or minimized also are possible, as long as the core particles are essentially fully formed (i.e., as long as mass addition to the core particle is essentially concluded) before initiating the coating operation.

Injection of the second FS can be carried out through nozzles designed for optimal distribution of FS in the gas stream. Such nozzles may be either single or bi-fluid. Bi-fluid nozzles may use, for example, steam, air, or nitrogen to atomize the fuel. Single-fluid nozzles may be pressure atomized. In some cases, the second FS can be directly injected into the stream containing $CH_2$, $H_2$ and PG.

The second FS can be provided in amounts sufficient to produce a desired coating of the core material. Typical ratios of the first FS to the second FS depend on various factors and can be determined by routine experimentation, calculations, prior experience or other means. The ratio of the first FS to second FS can be from about 10:1 to about 1:10, for instance within the range of from about 3:1 to about 1:1, or from about 2:1 to about 1:1 by mass.

Temperatures that promote the pyrolysis of the coating FS can be within a range of from about 900° C. to about 3000° C., such as within the range of from about 1300° C. to about 1900° C., e.g., from about 1400° C. to about 1800° C.

The coating or finishing zone (disposed around and downstream of injection point 114) can be heated, in whole or partially, by the hot gaseous stream passing through the reactor. In some implementations, the plasma operations used to form the core particles are conducted at temperatures high enough to provide all the thermal energy needed to carry out the coating process. For example, one or more additional plasma sources can be employed. Additional or alternate heating can be provided by preheating the second FS, recirculating hot off gases in an indirect heat exchange arrangement, or other means. Suitable temperatures that can be used for preheating the second FS (or other feeds employed in the method or apparatus described herein) can be the same or similar to those taught for preheating arrangements disclosed, for example, in U.S. Pat. No. 3,095,273 issued on Jun. 25, 1963 to Austin; U.S. Pat. No. 3,288,696 issued on Nov. 29, 1966 to Orbach; U.S. Pat. No. 3,984,528 issued on Oct. 5, 1976 to Cheng et al.; U.S. Pat. No. 4,315,901, issued on Feb. 16, 1982 to Cheng et al.; U.S. Pat. No. 4,765,964 issued on Aug. 23, 1988 to Gravley et al.; U.S. Pat. No. 5,997,837 issued on Dec. 7, 1999 to Lynum et al. U.S. Pat. No. 7,097,822 issued on Aug. 29, 2006 to Godal et al.; U.S. Pat. No. 8,871,173B2, issued on Oct. 28, 2014 to Nester et al. or CA 682982, all documents being incorporated herein by reference in their entirety. One specific approach utilizes off gas obtained from the reactor, heated, e.g., by plasma heating and dewatered, as described, for example, in U.S. Pat. No. 7,655,209, issued on Feb. 2, 2010 to Rumpf et al. and incorporated herein by reference in its entirety.

Figure 4:
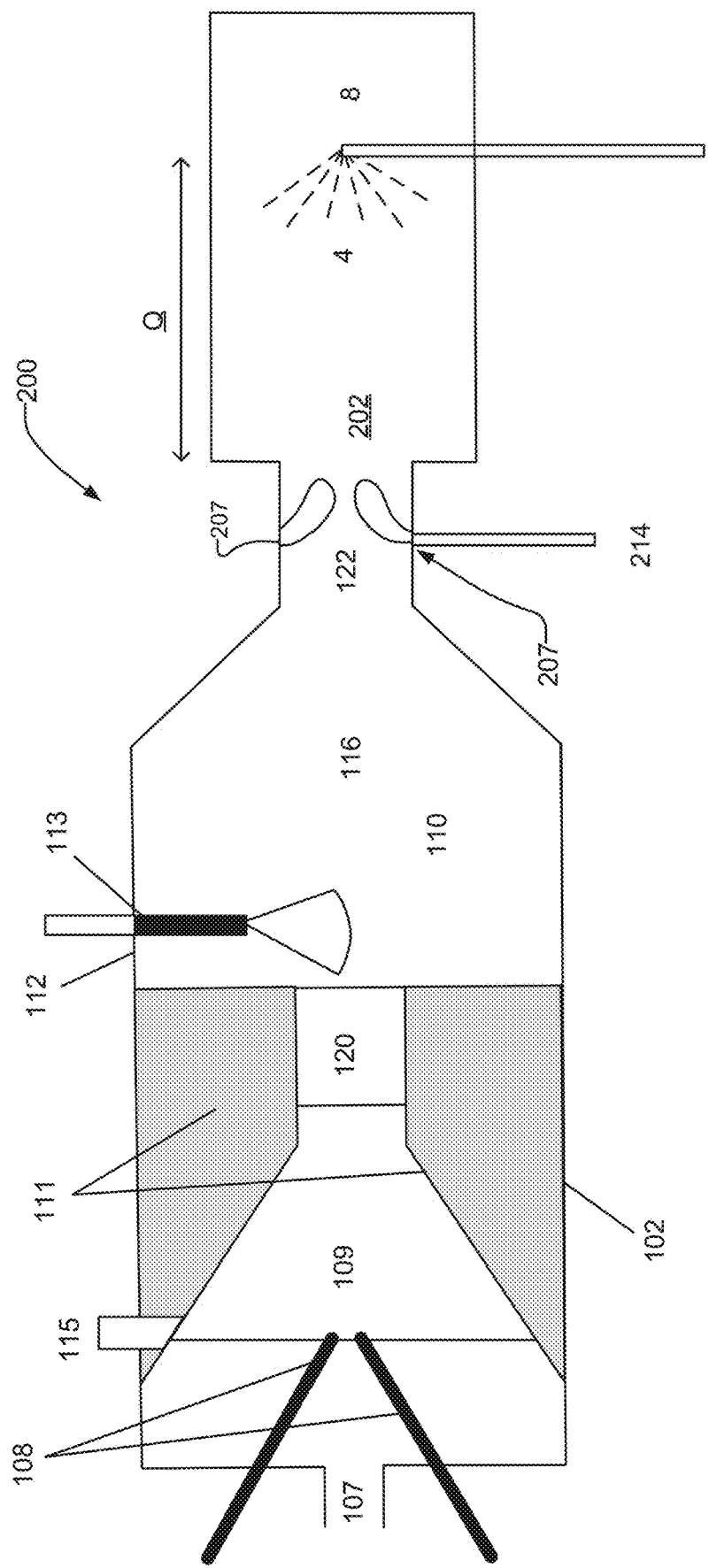
FIG. 4 is a cross sectional view of an apparatus for preparing coated particles using a finishing zone of a CB reactor.

In some aspects of the invention, the carbon-yielding FS used to coat in situ plasma CB is introduced in a finishing zone of a CB reactor, as described above, for instance. Shown in FIG. 4 is apparatus 200, comprising arc or plasma zone 109, reaction zone 110, both, essentially as described above, and finishing zone 202 of a CB reactor, e.g., of reactor 50 in FIG. 1. The second FS is introduced via feed line 214 and injection points 207 at throat 122. The coating reaction is arrested in zone 4, by disposing, for example, quench 8 downstream of the coating operation.

By introducing the second FS after the preparation of the core particles has been completed, carbon precursors (generated by pyrolysis of the coating FS to form dehydrogenated molecular fragments) are deposited (coated) onto the surface of the core particles to form the carbon coating.

Various additional steps can be undertaken. Turning to FIG. 2, for instance, the lower end of chamber 102 is connected to extraction means 105, through which the reaction products are removed from the reactor. These can be directed to standard separation means 106, e.g. cyclones and/or filters, wherein the coated particles are separated from hydrogen and other reaction products or by-products. Hydrogen can be separated from other off gas components and recycled as PG or a component thereof, for example. It can be utilized in other operations at the facility or transported for off-site use. Unreacted HC, acetylene and/or other off gas constituents can be directed for further use, exhausted or added to fresh HC in the production of plasma CB core particles.

In some embodiments, a plasma reactor such as, for example, a conventional plasma reactor, can be used to coat core particles, typically preformed, utilizing a coating FS such as NG, methane, hydrocarbons, e.g., C2 to C8 hydrocarbons (propane, butane, ethylene, propylene, butadiene, for example), light oil, heavy oil, waste or pyrolysis oil, biogas, or other coating FS compositions that include carbon and hydrogen. Gaseous FS do not require vaporization and thus may yield more uniform and/or thinner coatings. In specific examples, the coating FS contains little or no S and/or N, thus limiting emissions of $SO_x$ and/or $NO_x$ and reducing off gas cleanup requirements.

Amounts of preformed core material can be determined by routine experiments, can be based on theoretical modeling, prior experience, or other techniques. Factors considered in determining loadings can include equipment used, process parameters, specifics of the plasma CB material utilized, FS employed, and/or other streams utilized, downstream steps, targeted properties and others.

In an illustrative implementation, dry or wet cake silica is run through a fluid energy mill using NG as the fluid gas. The milled mixture is mixed with a hot plasma stream with reference to FIGS. 2 and 3, where NG is dehydrogenated and carbon deposits on the silica. Gas and particles can then be separated, by conventional means, for example. The process may provide an even carbon coating on the silica core (compared to coat obtained from liquid FS that must vaporize and then mix), high performance particles from silica core/C coating, little or no $SO_x$ and/or $NO_x$ emissions. Since total carbon load is less than that needed for preparing regular plasma CB, the approach may circumvent carbon grit formation.

The coating FS can be provided in conjunction with $H_2$, $N_2$, or another suitable plasma gas, such as described above, for example. In many instances, plasma gases and injection points of the gaseous FS (preferably downstream and in a manner that avoids recirculation back to the electrodes) are selected for reduced or minimized coking of the plasma electrodes. Coking may also be reduced or avoided by using a microwave plasma process.

In some cases, CB plasma core particles are prepared at one station, then directed to a finishing station where these particles are coated with a carbon deposit. This type of arrangement is referred to herein as a "production line" system, arrangement or process and is composed of various stations or unit operations that can be conducted independently of one another. In this approach one station can be shut down, e.g., for repairs or maintenance, while others can continue to operate. The need for synchronizing various operations is reduced or minimized. In other examples, two or more of the stations in a production line system operate in an interrelated fashion or in concert, to increase throughput, minimize energy requirements, realize recycling advantages and/or other benefits. A production line system or process can be configured for batch, semi-continuous or continuous operations. Similar production line arrangements can be utilized with cores other than plasma CB cores.

The coated particles described herein can be generated in conjunction with the formation of carbon particles, for instance, conventional CB. The mixture of composite particles and single-phase carbon particles can be used as is.

Carbon coated particles disclosed herein can have a core that is entirely or partially (e.g., 99%, 98%, 95%, 90%, 85%, 80%, 75%, 70%, 65%, 60%, 55%, 50%, 45%, 40%, 35%, 30%, 25%, 20%, 15%, 10% or less) coated with carbon. In specific examples the coating is amorphous carbon.

In specific implementations, the carbon layer or shell coats aggregates made of primary particles, such as, for example, silica aggregates having a particle size within the range of from about 20 nm to about 500 nm, such as from about 25 nm, 50 nm or 100 nm to about 200 nm, from about 200 nm to about 300 nm or from about 200 to about 400 nm. The coating can be as thin as a few nm or less, for example from about 0.5 to about 5 nm. In many cases, the coating can be as thick as about 20 nm. For instance, the coating can be from 0.5 to about 1 nm; from 0.5 nm to about 5 nm, form 1 nm to about 10 nm; from about 1 nm to about 15 nm; or from about 1 nm to about 20 nm thick. Resulting coated particles can have a particle size within the range of from about 20 nm to about 500 nm.

The carbon layer also can be deposited onto small agglomerates, such as, for instance, agglomerates made of aggregates and having a typical agglomerate or clump size within the range of from about 200 nm to about 5 microns, e.g., from about 200 nm to about 1 micron, such as from about 200 nm to about 300 nm, 400 nm, 500 nm, 600 nm, 700 nm, 800 nm or 900 nm.

Larger agglomerates (e.g., including the same or different aggregates and/or agglomerates), having, for example a characteristic dimension of 1 micron or more, often larger than 2, 3, 4 or 5 microns, also can become coated.

In some cases, the coated particles described here retain at least some of the properties characteristic to the core material, for example, in cases in which the carbon coating is sufficiently thin and/or does not completely cover the core. In other cases, the carbon coating will dominate overall properties. Relative to rubber applications, thin coatings may preserve the morphology and/or other properties of the core particle in the subsequent rubber compound. Thicker coatings may serve to impart primarily CB type properties and rubber performance. In some implementations, the carbon coated particles are designed to balance properties attributable to the core material and properties brought about by the carbon coating.

The coated particles can be characterized by the same properties as those used to analyze CB. These include but are not limited to specific surface area, structure, aggregate size, shape, and distribution; and chemical and physical properties of the surface. The properties of CB are analytically determined by tests known to the art. For example, nitrogen adsorption surface area and Statistical Thickness Surface Area (STSA), another measure of surface area, are determined by nitrogen adsorption following ASTM test procedure D6556-10. The Iodine number can be measured using ASTM procedure D-1510-13. CB "structure" describes the size and complexity of aggregates of CB formed by the fusion of primary CB particles to one another. As used here, the CB structure can be measured as the oil absorption number (OAN) for the uncrushed CB, expressed as milliliters of oil per 100 grams CB, according to the procedure set forth in ASTM D-2414-13. The Compressed Sample Oil absorption number (COAN) measures that portion of the CB structure which is not easily altered by application of mechanical stress. COAN is measured according to ATSM D3493-13. Aggregate size distribution (ASD) is measured according to ISO 15825 method using Disc Centrifuge Photosedimentometry with a model BI-DCP manufactured by Brookhaven Instruments.

CB materials having suitable properties for a specific application may be selected and defined by the ASTM standards (see, e.g., ASTM D 1765-03 Standard Classification System for Carbon Blacks Used in Rubber Products), by Cabot Corporation specifications (see, Web site www.cabot-corp.com), or other commercial grade specifications.

The coated particles disclosed herein can have a BET surface area, measured by Brunauer/Emmett/Teller (BET) technique according to the procedure of ASTM D6556, between 5 $m^2/g$ and 300 $m^2/g$, for instance between 50 $m^2/g$ and 300 $m^2/g$, e.g., between 100 $m^2/g$ and 300 $m^2/g$. In some cases, the BET surface area in within the range of from about 100 $m^2/g$ to about 200 $m^2/g$. In other cases, the BET surface area is within the range of from about 200 $m^2/g$ to about 300 $m^2/g$. The oil adsorption number (OAN) may be between 40 mL/100 g and 200 mL/100 g, for instance between 60 mL/100 g and 200 mL/100 g, such as between 80 mL/100 g and 200 mL/100 g, e.g., between 100 mL/100 g and 200 mL/100 g or between 120 mL/100 g and 200 mL/100 g, mL/100 g 140 mL/100 g and 200 mL/100 g mL/100 g, 160 and 200 mL/100 g or such as between 40 mL/100 g and 150 mL/100 g or 40 mL/100 g and 150 mL/100 g. The STSA can be within the range of from about 5 $m^2/g$ to about 275 $m^2/g$, e.g., from about 30 $m^2/g$ to about 250 $m^2/g$, such as between 30 $m^2/g$ and 200 $m^2/g$. The COAN can be within the range of from about 40 mL/100 g to about 150 mL/100 g, e.g., between about 55 mL/100 g to about 150 mL/100 g, such as between 80 mL/100 g and 120 mL/100 g. In specific implementations, the carbon-coated particles have a STSA within the range of from about 30 to about 250 $m^2/g$; and a COAN within the range of from about 55 to about 110 cc/100 g. In other instances, the STSA is within the range of from about 30 to about 250 $m^2/g$; and the COAN is within the range of from about 55 to about 150 cc/100 g. In some cases, the coated particles disclosed herein can have an STSA within the range of about 30 to about 250 $m^2/g$ and an OAN within the range about 55 to about 400 cc/100 g.

In some examples, the carbon core and the carbon outer region display different properties and different level of interaction with elastomer molecules and performance in rubber composites. In an integrated process such as, for instance the plasma process described above, properties of the core particles can be determined by running the overall process without adding the second FS, thus obtaining uncoated core particles that can be studied by one or more suitable technique(s). Introducing the second FS produces coated particles that can also be investigated. The results obtained for core particles and those for coated particles can then be compared. If desired, performance correlations can be established.

Other approaches can be employed. For example, cores utilizing reclaimed pyrolysis carbon can be differentiated from the outer carbon layer based on elements (e.g., alumina, silica, zinc oxide, and so forth) that are typically present in the core but not found in the carbon coating.

The coated particles described herein can undergo further processing. If desired, for instance, they can be surface treated or surface modified by techniques such as those known and practiced with CB materials.

Thus the coated particles can be prepared to contain small molecules and/or polymers, either ionic or nonionic, that are adsorbed on their surface.

In specific examples, the carbon-coated particles have functional groups (e.g., derived from small molecules or polymers, either ionic or nonionic) that are directly attached to the carbon surface. Examples of functional groups that can be directly attached (e.g., covalently) to the surface of the CB particles and methods for carrying out the surface modification are described, for example, in U.S. Pat. No. 5,554,739 issued to Belmont on Sep. 10, 1996 and U.S. Pat. No. 5,922,118 to Johnson et al. on Jul. 13, 1999, the teachings of both being incorporated herein by reference in their entirety. As one illustration, a surface modified CB that can be employed here is obtained by treating CB with diazonium salts formed by the reaction of either sulfanilic acid or para-amino-benzoic acid (PABA) with HCl and $NaNO_2$. Surface modification by sulfanilic or para-amino-benzoic acid processes using diazonium salts, for example, results in CB having effective amounts of hydrophilic moieties on the carbon coating.

Other techniques that can be used to provide functional groups attached to the surface of the carbon-coated particles are described in U.S. Pat. No. 7,300,964, issued to Niedermeier et al, on Nov. 27, 2007.

Oxidized (modified) carbon-coated particles can be prepared in a manner similar to that used on CB, as described, for example, in U.S. Pat. No. 7,922,805 issued to Kowalski et al. on Apr. 12, 2011, and in U.S. Pat. No. 6,471,763 issued to Karl on Oct. 29, 2002, and incorporated herein by reference in their entirety. An oxidized carbon-coated particle is one that that has been oxidized using an oxidizing agent in order to introduce ionic and/or ionizable groups onto the surface. Such particles may have a higher degree of oxygen-containing groups on the surface. Oxidizing agents include, but are not limited to, oxygen gas, ozone, peroxides such as hydrogen peroxide, persulfates, including sodium and potassium persulfate, hypohalites such a sodium hypochlorite, oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. Other surface modification methods, such as chlorination and sulfonylation, may also be employed to introduce ionic or ionizable groups.

In a specific embodiment, the coated particles are surface modified according to the teachings of U.S. Pat. No. 8,975,316 to Belmont et al., the contents of which are incorporated herein by reference in their entirety.

The coated particles can be utilized in various applications, such as, for example, as reinforcement in rubber products, tire components. Without wishing to be bound by a particular mechanism, it is believed that the activity of the CB rubber interaction is directly or indirectly related to the type of molecules from which the CB surface is formed.

Further aspects of the invention relate to end uses of the coated particles described herein, including, for instance, unmodified or surface modified carbon-coated particles. For example, the particles can be incorporated in rubber articles, being used, for instance, for tire tread, especially in tread for passenger car, light vehicle, truck and bus tires, off-the-road ("OTR") tires, airplane tires and the like; sub-tread; wire skim; sidewalls; cushion gum for retread tires; and other tire uses. In other applications, the particles can be used in industrial rubber articles, such as engine mounts, hydromounts, bridge bearings and seismic isolators, tank tracks or tread, mining belts, hoses, gaskets, seals, blades, weather stripping articles, bumpers, anti-vibration parts, and others.

The particles can be added as an alternative or in addition to traditional reinforcing agents for tire components and/or other industrial rubber end-uses. In many cases, they are provided in a manner that is the same or similar to known methods for introducing fresh CB in rubber products. For example, the material described herein can be combined with natural and/or synthetic rubber in a suitable dry mixing process based on an internal batch mixer, continuous mixer or roll mill.

Alternatively, the coated particles described herein may be mixed into rubber via a liquid Masterbatch process. For instance, a slurry containing the particles described herein also can be combined with elastomer latex in a vat and then coagulated by the addition of a coagulant, such as an acid, using the techniques described in U.S. Pat. No. 6,841,606.

In specific embodiments, the particles are introduced according to the teachings of U.S. Pat. No. 6,048,923, issued to Mabry et al. on Apr. 11, 2000, incorporated herein by reference in its entirety. For example, a method for preparing elastomer masterbatch can involve feeding simultaneously a particulate filler fluid and an elastomer latex fluid to a mixing zone of a coagulum reactor. A coagulum zone extends from the mixing zone, preferably progressively increasing in cross-sectional area in the downstream direction from an entry end to a discharge end. The elastomer latex may be either natural or synthetic and the particulate filler comprises, consists essentially of or consists of the material such as described above. The particulate filler is fed to the mixing zone preferably as a continuous, high velocity jet of injected fluid, while the latex fluid is fed at low velocity. The velocity, flow rate and particulate concentration of the particulate filler fluid are sufficient to cause mixture with high shear of the latex fluid and flow turbulence of the mixture within at least an upstream portion of the coagulum zone so as to substantially completely coagulate the elastomer latex with the particulate filler prior to the discharge end. Substantially complete coagulation can occur without the need of acid or salt coagulation agent. As disclosed in U.S. Pat. No. 6,075,084, incorporated herein by reference in its entirety, additional elastomer may be added to the material that emerges from the discharge end of the coagulum reactor. As disclosed in U.S. Pat. No. 6,929,783, incorporated herein by reference in its entirety, the coagulum may then be fed to a dewatering extruder. Other examples of suitable masterbatch processes are disclosed in U.S. Pat. No. 6,929,783 to Chung et al.; US 2012/0264875A1 application of Berriot et al.; U.S. 2003/0088006A1 application of Yanagisawa et al.; and EP 1 834 985 B1 issued to Yamada et al.

Particles may be evaluated in a suitable rubber formulation, utilizing natural or synthetic rubber. Suitable amounts of coated particles to be used can be determined by routine experimentation, calculations, by taking into consideration factors such as typical loadings of standard ASTM furnace blacks in comparable manufacturing processes, parameters specific to the techniques and/or equipment employed, presence or absence of other additives, desired properties of the end product, and so forth.

The performance of the coated particles described herein as reinforcing agent for rubber compounds can be assessed by determining, for example, the performance of a rubber composition utilizing the particles relative to the performance of a comparative rubber composition that is similar in all respects except for the use of a CB grade suitable for the given application. In other approaches, values obtained for compositions prepared according to the invention can be compared with values known in the art as associated with desired parameters in a given application.

Suitable tests include green rubber tests, cure tests, and cured rubber tests. Among appropriate green rubber tests, ASTM D4483 sets forth a test method for the ML1+4 Mooney Viscosity test at 100° C. Scorch time is measured according to ASTM D4818.

The curing curve is obtained by Rubber Process Analyzer (RPA2000) at 0.5°, 100 cpm, and 150C (NR)-160C (SBR) according to ASTM D5289.

Performance characteristics of cured samples can be determined by a series of appropriate tests. Tensile strength, elongation at break, and stress at various strains (e.g. 100% and 300%) are all obtained via ASTM D412 Method A. Dynamic mechanical properties including storage modulus, loss modulus, and tan δ are obtained by strain sweep test at 10 Hz, 60C and various strain amplitudes from 0.1% to 63%. Shore A hardness is measured according to ASTM D2240. Tear strength of die B type cured rubber samples are measured according to ATSM D624.

Undispersed area is calculated by analyzing images obtained by reflection mode optical microscopy for cured rubber compounds of a cut cross-sectional area according to various reported methods. Dispersion can also be represented by the Z value (measured, after reticulation, according to the method described by S. Otto and Al in Kautschuk Gummi Kunststoffe, 58 Jahrgang, NR 7-8/2005, article titled *New Reference value for the description of Filler Dispersion with the Dispergrader 1000NT*. Standard ISO 11345 sets forth visual methods for the rapid and comparative assessment of the degree of macrodispersion of CB and CB/silica in rubber.

Abrasion resistance is quantified as an index based on abrasion loss of cured rubber by the Cabot Abrader (Lambourn type). Attractive abrasion resistance results can be indicative of advantageous wear properties. Good hysteresis results can be associated with low rolling resistance (and correspondingly higher fuel economy) for motor vehicle tire applications, reduced heat build-up, tire durability, tread life and casing life, fuel economy features for the motor vehicle and so forth.

The invention is further described by the following non-limiting examples.

EXAMPLE 1

Experiments were conducted in a pilot plant using a CB reactor such as that shown in FIG. 1. Conditions for runs A, B and C are shown in Table 1.

In each case, a combustion zone equivalence ratio of 1.43 to 1.67 was used wherein this amounts to 30-40% of a fuel rich combustion reaction. The primary fuel for the combustion reaction was natural gas and introduced to the reactor through stream 9. The natural gas fed to the CB forming process was about ambient temperature of approximately 77° F. The liquid carbon FS utilized was a commercially available FS having the typical properties listed in U.S. Pat. No. 5,190,739 to MacKay, et al. The precursor for forming silica cores was octamethylclotetrasiloxane [D4] supplied by Dow Corning corporation, Midland, Mich. (Xiameter® brand). Both the CB yielding FS and the precursor were co-injected in the presence of a stream of hot gases formed in the combustion zone at zone 3 through stream 6. The liquid silicon-containing precursor and liquid CB yielding FS were introduced to the process in the varying amounts as shown in Table 1. The reaction was halted using a water quench at zone 8.

TABLE 1

| Parameter | Run A | Run B | Run C |
| --- | --- | --- | --- |
| Air Rate, $Nm^3/hr$ | 1600 | 1600 | 1600 |
| Air Preheat Temp, ° C. | 500 | 500 | 500 |
| Natural Gas Rate, $Nm^3/hr$ | 239.5 | 279.5 | 239.5 |
| Carbon Black Feedstock Rate, kg/hr | 98.7 | 49.9 | 65.1 |
| Silica Precursor Rate kg/hr | 150 | 200 | 150 |
| STSA, $m^2/g$ | 134 | 132.1 | 138.2 |
| COAN, cc/100 g | 97.4 | 95.3 | 95.8 |
| Particle Ash Content % | 65.4 | 72.3 | 62.6 |

The resulting particles having a silica core and a carbon coating, prepared as described above and having the properties shown in Table 1, were observed by electron transmission microscopy (TEM).

Figure 5:
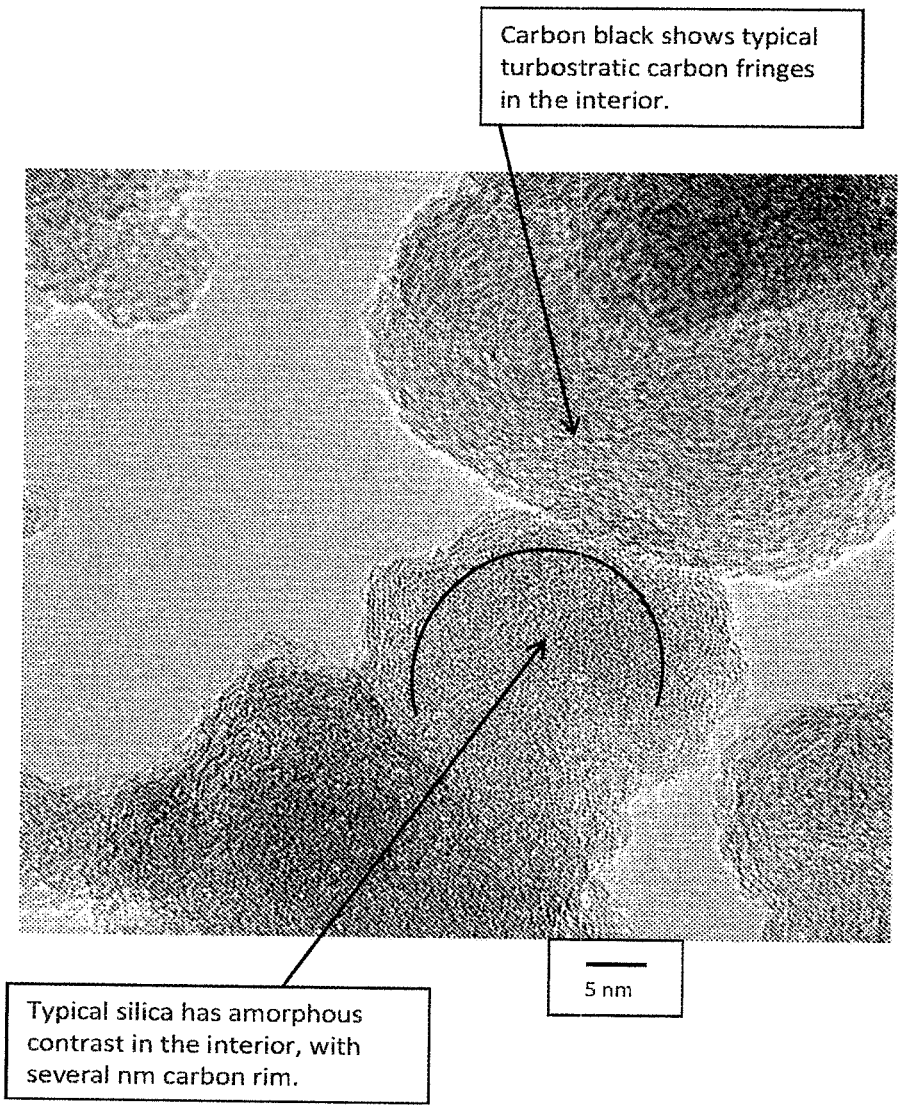
FIG. 5 is a transmission electron micrograph of a dual phase particle having a silica core coated with a carbon layer.

Specimens were prepared by sonicating in alcohol and chloroform and dropping onto holey carbon grids. Dispersion was found sufficient to obtain views of aggregates over holes. As seen in FIG. 5, the dominant microstructure was aciniform silica coated with 1-5 nm thick layer of carbon. This was determined by the amorphous contrast of the silica cores and the turbostatic fringes of the carbon coating. The carbon coated the silica aggregates as a whole, rather than individual primary particles. Some single phase CB particles also were observed.

EXAMPLE 2

Ground rice husk particles, which contain approximately 20% naturally occurring nano-silica domains are added into stream 5 of FIG. 1 to the preheated air supplied to the combustion zone by means of a loss-in-weight feeder (Schenck AccuRate Mechatron MC Feeder manufactured by Schenck Process, Chagrin Falls, Ohio). The air is enriched to 25% oxygen. The process is conducted in a reactor such as that shown in FIG. 1. Particles are conveyed through the combustion zone, and due to the high temperature and presence of excess oxygen in both the air duct, and especially the combustion zone, a significant portion of the outer carbonaceous material in the rice husk is gasified, leaving small domains of silica. These particles are carried along with the combustion gases into the reaction zone (zone 3 in FIG. 1). CB FS is sprayed into the combustion gas stream via stream 6 orthogonal to the flow and vaporized, after which nucleation and pyrolysis begin to occur. Due to the presence of a large population of silica particles in the combustion zone, deposition is favored over nucleation, and the majority of the CB formed is deposited as a coating atop the existing silica particulates. The reaction mixture is quenched downstream (zone 8) with water to cool the coated particles and end the pyrolysis reaction. The result is a particle with an interior which is composed mostly of silica, and an exterior coating of CB. Table 2 shows the flow rates of the various inputs to the reactor.

TABLE 2

| Parameter | |
| --- | --- |
| Air Rate, $Nm^3/hr$ | 1600 |
| Supplemental Oxygen Rate, $Nm^3/hr$ | 86.5 |
| Air Preheat Temp, ° C. | 500 |
| Natural Gas Rate, $Nm^3/hr$ | 83.7 |

TABLE 2-continued

| Parameter | |
| --- | --- |
| Milled Rice Husk Rate, kg/hr | 150 |
| Carbon Black Feedstock Rate, kg/hr | 188.5 |

EXAMPLE 3

PS having a surface area of 160 $m^2/g$ is mixed with CB FS in a shear mixing tank along with an appropriate surfactant to produce a slurry of 30% PS by weight. The process is conducted in a reactor such as shown in FIG. 1. A combustion fuel is burned with excess air in a combustion zone 1, with the hot product gases being conveyed downstream into the reaction zone 3. The CB FS/PS slurry is injected orthogonal to the combustion gas flow under pressure into the reactor through stream 6. The FS is first vaporized, leaving porous droplet-shaped domains of silica behind. As the vaporized CB FS begins to pyrolyze and condense, deposition onto the silica particles dominates over nucleation, and the majority of the CB formed is a coating atop the existing silica particles. The reaction mixture is quenched downstream (zone 8) with water to cool the coated particles and end the pyrolysis reaction. Table 3 shows the flow rates of the various inputs to the reactor.

TABLE 3

| Parameter | |
| --- | --- |
| Air Rate, $Nm^3/hr$ | 1600 |
| Air Preheat Temp, ° C. | 500 |
| Primary Combustion, % | 200 |
| Natural Gas Rate, $Nm^3/hr$ | 83.7 |
| Carbon Black Feedstock/PS Slurry Rate, kg/hr | 560 |

EXAMPLE 4

Reclaimed pyrolysis carbon particles are added upstream of the reactor to the preheated air (stream 5 in FIG. 1) supplied to the combustion zone by means of a loss-in-weight feeder (Schenck AccuRate Mechatron MC Feeder manufactured by Schenck Process, Chagrin Falls, Ohio). The air is enriched to 25% oxygen. Particles are conveyed through the combustion zone, and due to the high temperature and presence of excess oxygen in both the air duct, and especially the combustion zone, a significant portion of the particles are gasified, leaving some portion of the particles remaining in the combustion gas stream. The carbon which is consumed in the combustion zone replaces natural gas as a combustion fuel. The particles are carried along with the combustion gases into the reaction zone (zone 3 in FIG. 1). CB FS is sprayed into the combustion gas stream via steam 6 orthogonal to the flow and vaporized, after which nucleation and pyrolysis begin to occur. A carbon coating is deposited onto the reclaimed pyrolysis carbon core. The reaction mixture is quenched downstream (zone 8) with water to cool the coated particles and end the pyrolysis reaction. The result is a particle with an interior which is composed mostly of reclaimed pyrolysis carbon and an exterior coating of CB. Table 4 gives the flow rates of the various inputs to the reactor.

TABLE 4

| Parameter | |
|---|---|
| Air Rate, Nm³/hr | 1600 |
| Supplemental Oxygen Rate, Nm³/hr | 86.5 |
| Air Preheat Temp, ° C. | 500 |
| Natural Gas Rate, Nm³/hr | 83.7 |
| Reclaimed Pyrolysis Carbon Rate, kg/hr | 150 |
| Carbon Black Feedstock Rate, kg/hr | 188.5 |

EXAMPLE 5

PS with a surface area (SA) of about 160 m²/g in the form of a wet cake is milled using a fluid energy mill. The milled material is conveyed into the combustion zone through stream 10 which can be a gas such as air or nitrogen. The water is driven off by heat from the combustion reaction, and the silica particles are entrained in the combustion gas flow. CB FS is sprayed into the combustion gas stream via stream 6 orthogonal to the combustion flow and vaporized, after which nucleation and pyrolysis begin to occur. A carbon coating is deposited onto the PS core. The reaction mixture is quenched downstream (zone 8) with water to cool the coated particles and end the pyrolysis reaction. The result is a particle with an interior which is composed mostly of silica and an exterior coating of CB. The flow rates of the various inputs to the reactor are shown in Table 5.

TABLE 5

| Parameter | |
|---|---|
| Air Rate, Nm³/hr | 1600 |
| Air Preheat Temp, ° C. | 500 |
| Natural Gas Rate, Nm³/hr | 175.6 |
| Wet Precip Silica Rate, kg/hr, dry basis | 120 |
| Carrier Gas Rate, Nm³/hr | 120 |
| Carbon Black Feedstock Rate, kg/hr | 344.5 |

EXAMPLE 6

Figure 3:
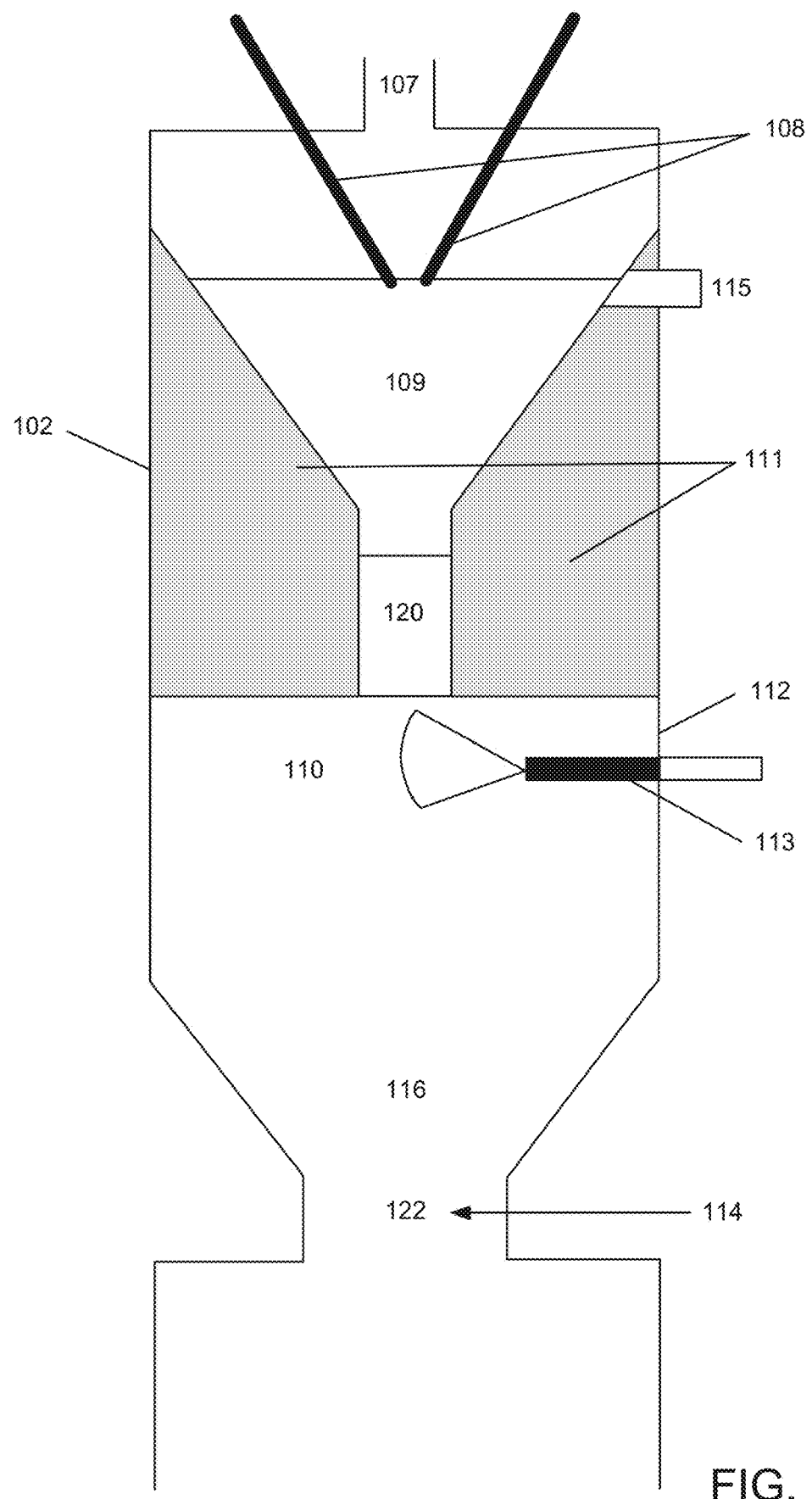
FIG. 3 is a more detailed view of the upper part of the apparatus of FIG. 2.

In a plasma reactor as illustrated by FIG. 3, a hydrogen flow of 500 Nm³/h is added through port 107. Electrodes (108) are supplied with 2.0 MW of electrical power, creating a hot plasma gas. The hot plasma gas is passed through contraction (throat) 120, which is 2.5 inches in diameter, increasing the velocity. At injection location 13, 150 kg/hr of liquid hydrocarbon FS is added to the flowing hot plasma gas through three pressurized nozzles arranged radially (with an orifice of 0.5 mm each at 700 psig). The liquid carbon FS utilized is decant oil, a commercially available CB FS. Upon mixing with the hot plasma gas, the liquid hydrocarbon FS undergoes pyrolysis to form CB and hydrogen gas. The mixture of hot $H_2$, other tail gases and CB is then accelerated through convergence zone 116 and contraction (throat) 122, the latter having a diameter of 3 inches, where a second injection at location 114 of 75 kg/h of liquid carbon FS (also decant oil) is added to the mixture through three radially arranged pressurized tips (with an orifice of 0.4 mm each, at 400 psig). This second FS pyrolyzes to CB and $H_2$ and preferentially coats the plasma CB core particles which were formed in zone 110, increasing their mass, decreasing their surface area, and increasing their structure.

EXAMPLE 7

In a plasma reactor such as that illustrated by FIG. 3, a hydrogen flow of 500 Nm³/h is added through port 107. Electrodes (108) are supplied with 2.0 MW of electrical power, creating a hot plasma gas. The hot plasma gas is passed through contraction (throat) 120, which is 2.5 inches in diameter, increasing the velocity. At location 113, 440 Nm³/h of methane is injected into the plasma gas through three radially arranged injection ports of diameter 6.5 mm each. Upon impact and mixing with the plasma gas the methane undergoes pyrolysis to form CB and hydrogen gas. The mixture of hot 112, other tail gases and CB is then accelerated through convergence zone 116 and constriction (throat) 122, the latter having a diameter 3 inches, where an injection at location 114 of 75 kg/h of liquid carbon FS (also decant oil) is added to the mixture through three radially arranged pressurized tips (with an orifice of 0.4 mm each, at 400 psig). This second. FS pyrolyzes to CB and $H_2$ and preferentially coats the plasma CB core particles which were formed in zone 110, increasing their mass, decreasing their surface area, and increasing their structure.

While this invention has been particularly shown and described with references to preferred embodiments thereof, it will be understood by those skilled in the art that various changes in form and details may be made therein without departing from the scope of the invention encompassed by the appended claims.

What is claimed is:

1. Carbon-coated particles comprising a non-carbon core, a reclaimed pyrolysis carbon core, or a plasma CB core coated by a carbon layer, wherein the carbon-coated particles have a STSA within the range of from about 30 to about 250 m²/g and a COAN within the range of from about 55 to about 150 cc/100 g.

2. The carbon-coated particles of claim 1, wherein the non-carbon core is formed from a material selected from the group consisting of precipitated silica, fumed silica, surface modified silica and any combination thereof.

3. The carbon-coated particles of claim 1, wherein the non-carbon core is formed from nanoparticles of clay, rice husk silica, calcium carbonate and any combination thereof.

4. The carbon-coated particles of claim 1, wherein the carbon layer is from about 0.5 nm to about 20 nm thick.

5. The carbon-coated particles of claim 1, wherein the non-carbon core, the reclaimed pyrolysis carbon core, or the plasma CB core has aciniform microstructure.

6. The carbon-coated particles of claim 1, wherein the carbon-coated particles have a STSA within the range of from about 30 to about 250 m²/g and a COAN within the range of from about 55 to about 110 cc/100 g.

7. Carbon-coated particles comprising a non-carbon core, a reclaimed pyrolysis carbon core, or a plasma CB core coated by a carbon layer, wherein the carbon-coated particles are prepared by a process comprising:
   preparing GB core particles in a plasma process; and
      coating the CB core particles with a carbon layer to form the carbon-coated particles;
      wherein the carbon-coated particles have a STSA within the range of from about 30 to about 250 m²/g; and an OAN within the range of from about 55 to about 400 cc/100 g.

8. The carbon-coated particles of claim 1, wherein the surface of the coated particles is modified.

* * * * *

UNITED STATES PATENT AND TRADEMARK OFFICE
CERTIFICATE OF CORRECTION

| | |
|---|---|
| PATENT NO. | : 11,198,774 B2 |
| APPLICATION NO. | : 16/693233 |
| DATED | : December 14, 2021 |
| INVENTOR(S) | : David M. Matheu et al. |

It is certified that error appears in the above-identified patent and that said Letters Patent is hereby corrected as shown below:

In the Claims

At Column 30, Line 55, Claim 7, that portion of the sentence reading "preparing GB" should read -- preparing CB --

Signed and Sealed this
First Day of August, 2023

*Katherine Kelly Vidal*

Katherine Kelly Vidal
*Director of the United States Patent and Trademark Office*